United States Patent
Kuchi et al.

(10) Patent No.: US 12,101,270 B2
(45) Date of Patent: Sep. 24, 2024

(54) MASSIVE MIMO INTERFERENCE SUPPRESSION RECEIVERS AIDED BY NETWORK SIGNALING

(71) Applicant: WISIG NETWORKS PRIVATE LIMITED, Madinaguda Hyderabad (IN)

(72) Inventors: Kiran Kumar Kuchi, Hyderabad (IN); Harish Kumar Dureppagari, Hyderabad (IN); Makandar Sibgath Ali Khan, Hyderabad (IN); Saidhiraj Amuru, Hyderabad (IN)

(73) Assignee: WISIG NETWORKS PRIVATE LIMITED (IN)

( * ) Notice: Subject to any disclaimer, the term of this patent is extended or adjusted under 35 U.S.C. 154(b) by 372 days.

(21) Appl. No.: 17/691,529

(22) Filed: Mar. 10, 2022

(65) Prior Publication Data

US 2022/0393817 A1 Dec. 8, 2022

(30) Foreign Application Priority Data

Jun. 8, 2021 (IN) .............................. 202141025565

(51) Int. Cl.
*H04L 5/00* (2006.01)
(52) U.S. Cl.
CPC .......... *H04L 5/0048* (2013.01); *H04L 5/0007* (2013.01)

(58) Field of Classification Search
CPC .......................... H04L 5/0048; H04L 5/0007
See application file for complete search history.

(56) References Cited

U.S. PATENT DOCUMENTS 10,433,200 B2 * 10/2019 Lee .......................... H04L 5/00

* cited by examiner

*Primary Examiner* — Sulaiman Nooristany
(74) *Attorney, Agent, or Firm* — McAndrews, Held & Malloy, Ltd.

(57) ABSTRACT

Embodiments of the present disclosure relate to a base station and method for communication in a communication network. The method comprising signaling a DMRS-configuration or SRS-configuration to at least one UE. The DMRS-configuration comprises signaling at least one antenna port number from multiple antenna port numbers, each antenna port number indicates location of occupied subcarriers and null subcarriers associated with a DMRS transmission of the at least one UE. The SRS-configuration comprises signaling of parameters associated with a time, a frequency and a code. The method also comprises receiving a data and DMRS signals, or SRS signals corresponding to the at least one UE. Further, grouping a subset of the signals corresponding to a subset of antennas to generate a plurality of signal groups. Next, performing first stage filtering at RU followed by second stage filtering at DU of the signals associated with each signal groups to obtain filtered signals.

25 Claims, 19 Drawing Sheets

MASSIVE MIMO INTERFERENCE SUPPRESSION RECEIVERS AIDED BY NETWORK SIGNALING

TECHNICAL FIELD

Embodiments of the present disclosure are related, in general to communication, but exclusively related to method of communication between plurality of base stations and a plurality of user equipment's.

BACKGROUND

With more number of antennas at BS, there is a need to make channel estimation more reliable and thereby increasing the reliability of data decoding. That is, there is a need to maintain minimum SINR on each receive antenna at BS to have reliable channel estimation and equalization. That is Signal to Interference plus Noise (I+N) Ratio (SINR) on received reference signal (RS) should be good enough to obtain reliable channel estimates. One way to increase SINR is to suppress inter-cell interference levels. Some of the existing methods to suppress inter-cell interference are power control, using Interference Rejection Combiner (IRC) at receiver, using specific beamforming by exploiting multiple antennas at the base station. However, performance of all these different methods is limited by the number of interferers causing the interference. So if we can reduce the number of interferers we can further reduce the inter-cell interference.

To reduce the number of interferers we proposed a novel port signaling method in which distinct BSs signal distinct RS ports to the users scheduled in those respective BSs. Port signaling is done such that users scheduled in distinct BSs are signaled with orthogonal RS ports. Orthogonality in RS ports help in reducing the number of active interferers and thereby increasing the SINR. This method is proved to be outperforming all the existing methods by a significant margin.

There are two ways in which uplink channel coefficients can be estimated. One is transmitting uplink Sounding Reference Signal (SRS) and another one is transmitting Demodulation Reference Signal (DMRS) along with PUSCH (Physical Uplink Shared Channel) to estimate uplink channel coefficients. These estimated uplink channel coefficients are used to construct the uplink receiver and there by detecting the data that is transmitted.

FIG. 1 shows an illustration of Type-1 demodulation reference signal (DMRS) Configuration in 5G NR. FIG. 2A shows an illustration of Type-2 DMRS Configuration in 5G NR.

In 5G NR, two DMRS configuration types have support as shown in FIGS. 1 and 2. As shown in FIGS. 1 and 2, for configuration type-1, 6 subcarriers per PRB either even or odd are assigned to a port in case of single DMRS, 12 subcarriers either even or odd subcarriers and 2 symbols per PRB are assigned to a port in case of double symbol DMRS. Similarly, a maximum of 8 DMRS ports are supported in configuration type-1 as shown in FIG. 2B.

FIG. 2B shows an illustration of a maximum DMRS Ports in Type-1 and Type-2 DMRS configuration. In case of configuration type-2, two groups of two consecutive subcarriers per PRB are assigned to a port in case of single DMRS, two groups of two consecutive subcarriers and 2 symbols per PRB are assigned to a port in case of double DMRS. In similar fashion, maximum of 12 DMRS ports are supported in configuration type-2 as shown in FIG. 2B.

In 5G NR, UL SU-MIMO supports maximum of 4 layers. In generally, 4 ports for SU-MIMO transmission are used. For MU-MIMO, a maximum of 8 layers with configuration type-1 and maximum of 12 layers with configuration type-2 can be used. The DMRS configuration types provide a provision to alternate between ports that are used for the transmission of uplink DMRS and thereby reducing interference caused by the users of other cells on the DMRS transmissions. This helps in better channel estimation and improved equalization on the required data signals. Base station needs to signal the port number assigned to a user which thereby indicates the subcarrier tones to be used by the UE for the DMRS transmissions.

The proposed port signaling is being used in two-stage filtering at BS receiver. The massive MIMO BS comprises a plurality of antennas, at least one radio unit (RU), at least one distributed unit (DU), an interface configured for a communication between the at least one RU and the at least one DU. The port numbers indicated to the UE will also be communicated between the DU and the at least one RU using the signaling methods in ORAN wherein the subcarriers occupied by the DMRS or in general RS tones are indicated by means of a bitmap that indicates the locations for the DMRS/RS subcarriers. This allows for coordination between the DU and RU. The proposed method also comprises receiving, by the at least one RU, a plurality of signals corresponding to the plurality of antennas. The plurality of signals comprises at least one of data signals, demodulation reference signals (DMRS) and sounding reference signals (SRS). Also, the method comprises grouping, by the at least one RU and the at least one DU, a subset of the plurality of signals corresponding to a subset of antennas to a group, to generate a plurality of signal groups. The signals associated with each group is at least one of the data signals, the DMRS and the SRS. Further, the method comprises performing a first stage filtering, by the RU, on the plurality of signal groups associated with each group using one or more group specific filters to obtain one or more group specific filtered signals. The group specific filters are determined using at least one of the signals associated with the group, and a set of values communicated by the DU to the RU, wherein said set of values are determined by the DU based on SRS or predetermined values. The said set of values are communicated between DU and RU using the ORAN signaling via a set of messages that indicate the values to be applied on the incoming signal. Furthermore, the method comprises performing a second stage filtering, by the DU, on the one or more group specific filtered signals associated with a plurality of the signal groups to obtain one or more second stage filtered signals.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method for communication in a communication network, said communication network comprising a plurality of base stations (BSs) spatially distributed in a geographic region and at least one user equipment (UE) being connected to each of the plurality of BSs, is disclosed. The method comprising signaling, by a BS, at least one of a demodulation reference signal (DMRS) configuration and a sounding reference signal (SRS) configuration to at least one UE, said DMRS configuration comprises signaling at least one antenna port number from a plurality of antenna port numbers, said at least one antenna port number indicates location of occupied subcarriers and null subcarriers associated with a DMRS transmission of the at least one UE, said SRS configuration comprises signaling of parameters associated with a time, a frequency and a code. Also, the method comprises receiving, by the BS, at least one of a data and DMRS signals corresponding to the at least one UE, said data and said DMRS signals are being received on one or more receive antennas of the at least one BS; and SRS signals corresponding to the at least one UE, said SRS signals being received on one or more receive antennas of the at least one BS. Further, the method comprises grouping, by the BS, a subset of the plurality of signals corresponding to a subset of antennas to generate a plurality of signal groups, wherein signals associated with each of the plurality of signal groups is at least one of the data signals, and the DMRS signals. Next, the method comprises performing a first stage filtering, by the BS, on the plurality of signals associated with each of the plurality of signal groups using one or more group specific filters to obtain one or more group specific filtered signals; wherein said group specific filters are determined using a set of parameters, wherein said set of parameters are determined based on one of the DMRS signals and the SRS signals. The set of parameters determined based on DMRS signals include channel values and interference values measured from occupied and null subcarriers associated with the signaled at least one antenna port number. The set of parameters determined based on SRS signals include channel values associated with the SRS configuration. Thereafter, the method comprises performing a second stage filtering, by the BS, on the one or more group specific filtered signals associated with a plurality of the signal groups to obtain one or more second stage filtered signals.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 4A:
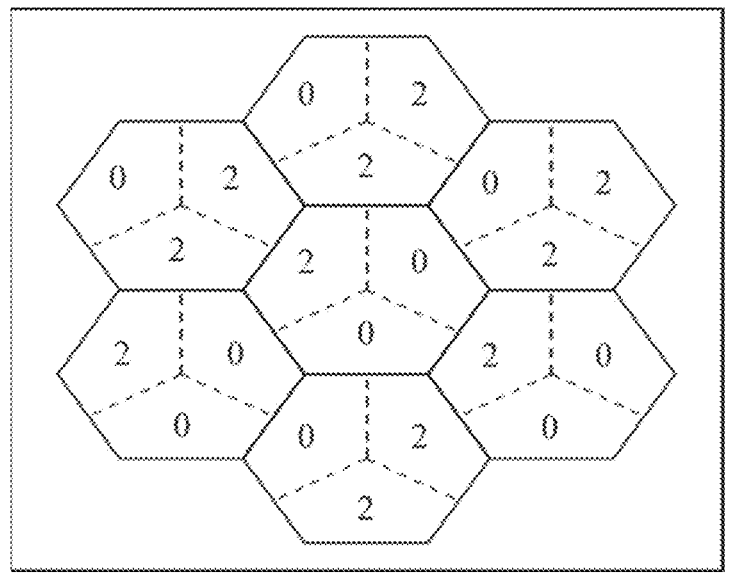
Figure 4B:
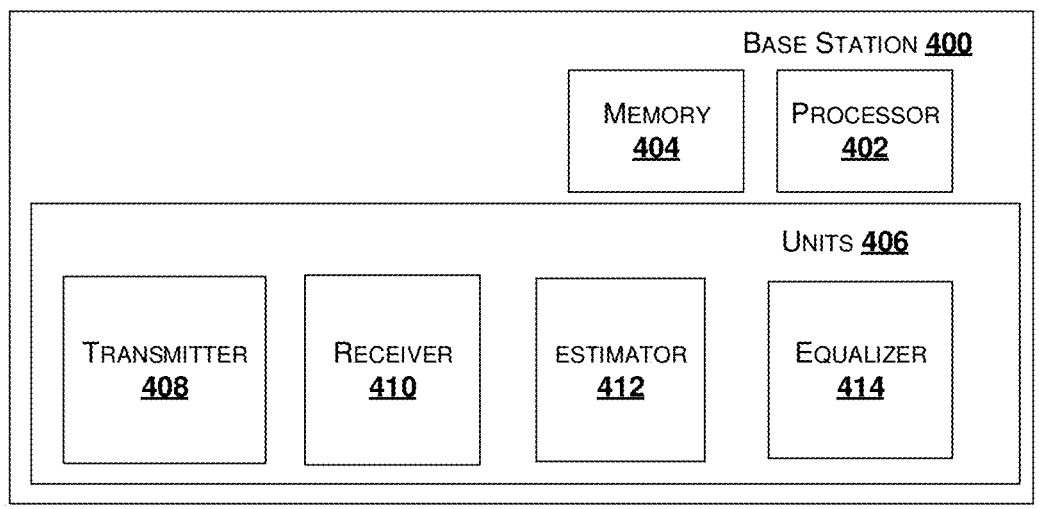
Figure 5:
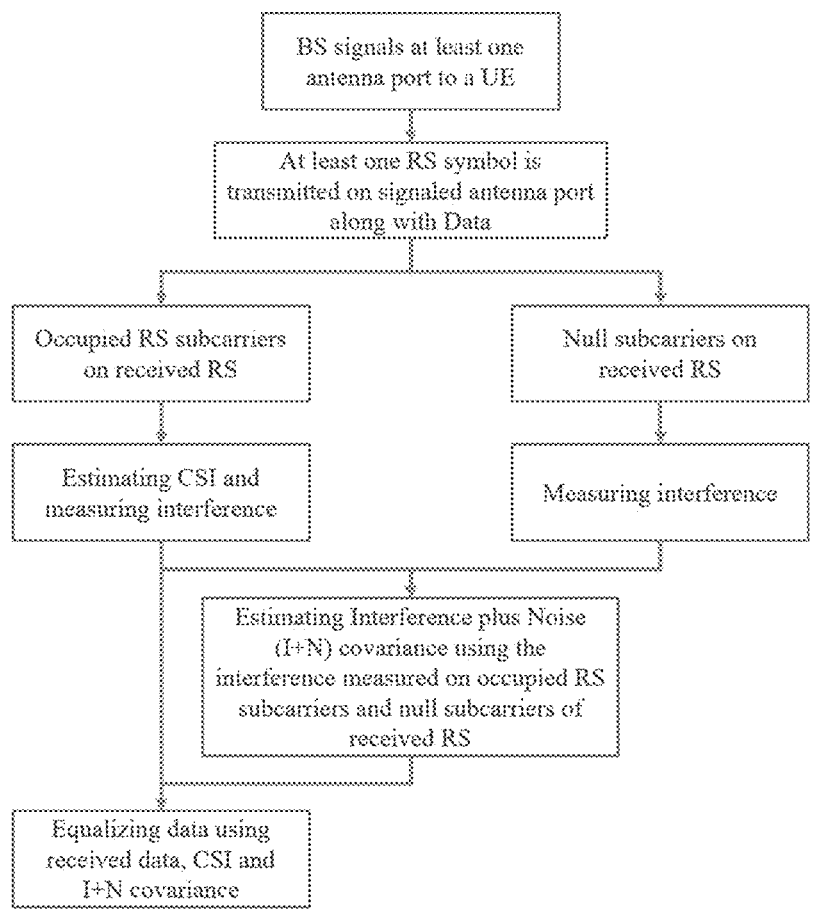
Figure 6:
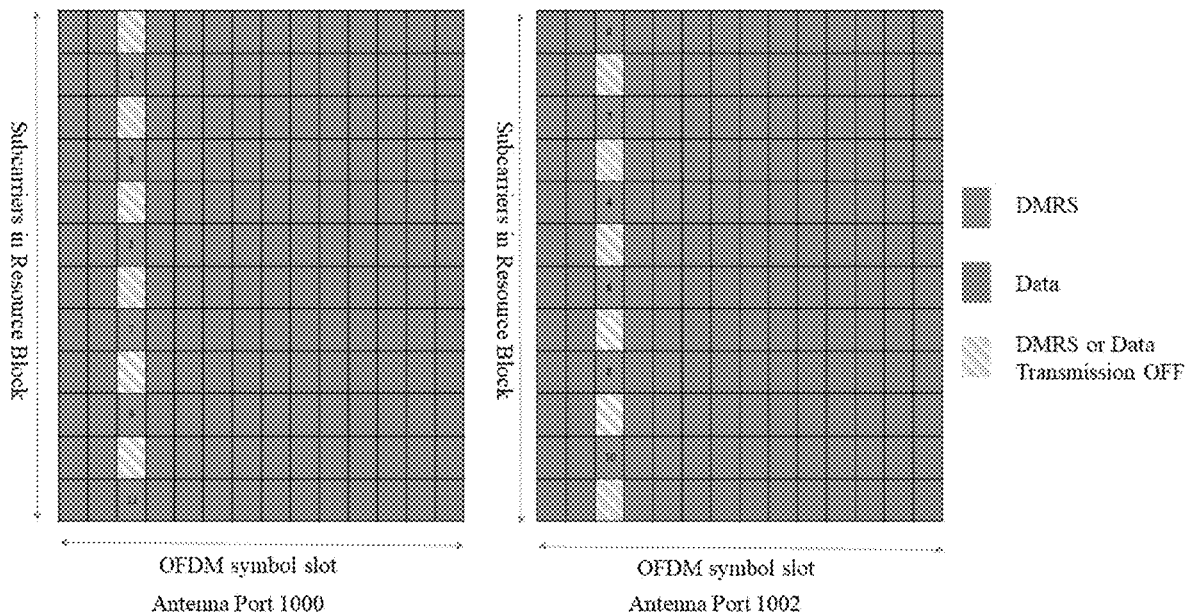
Figure 7A:
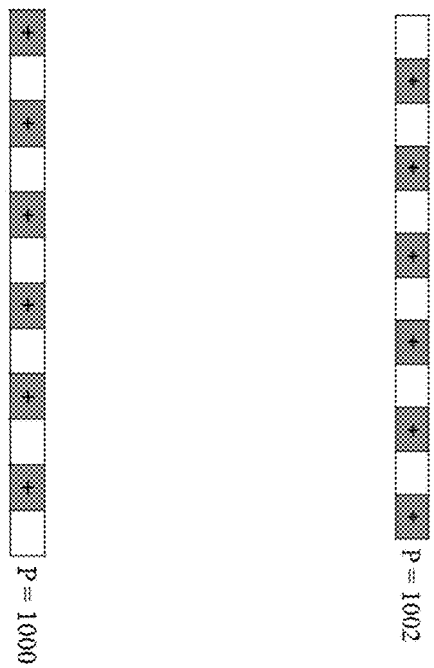
Figure 7B:
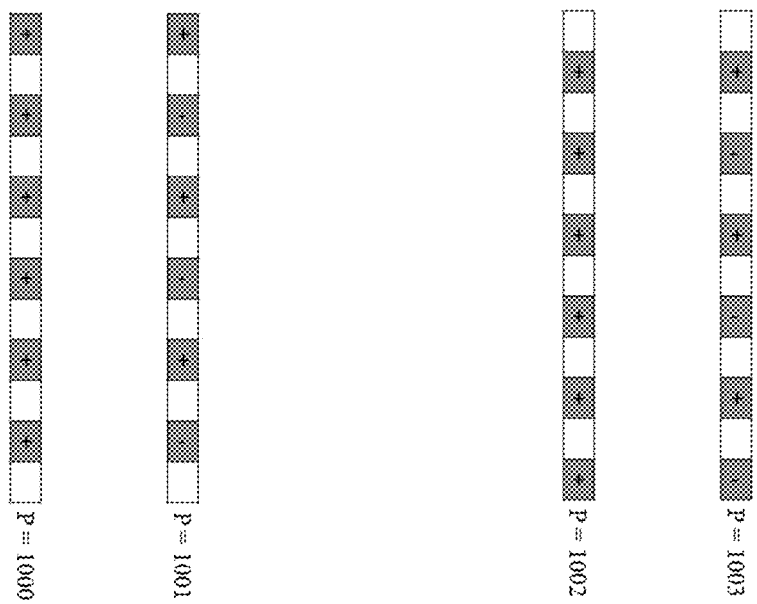
Figure 8A:
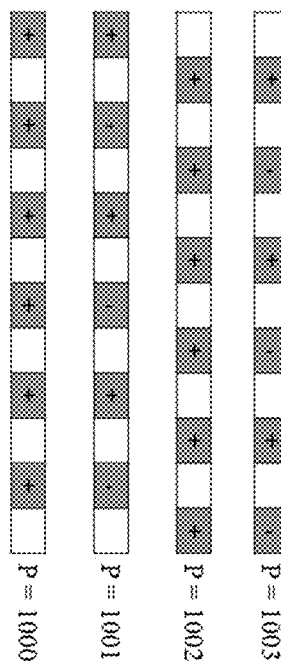
Figure 8B:
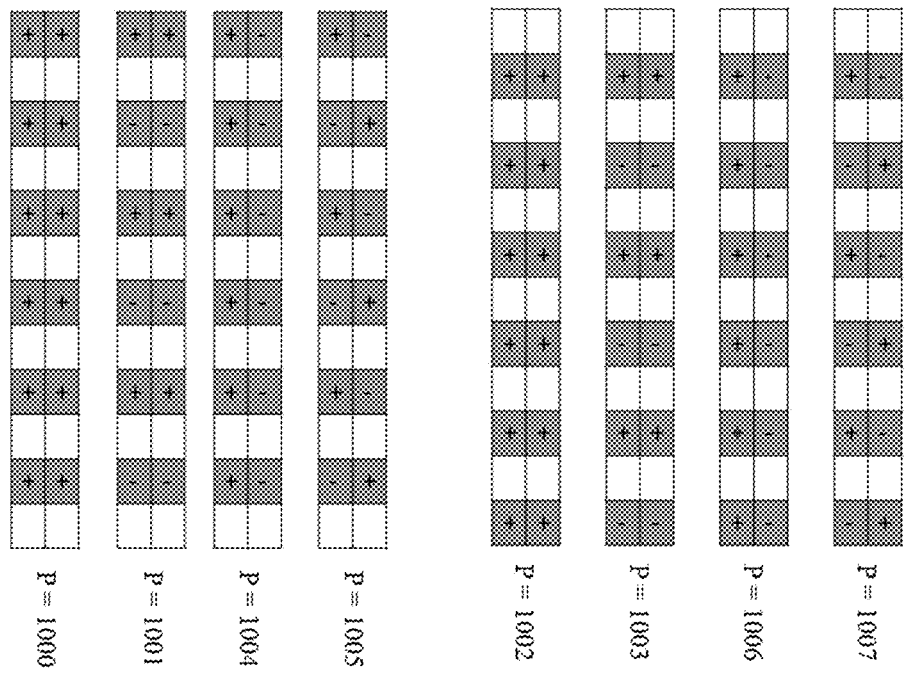
Figure 9A:
Figure 9B:
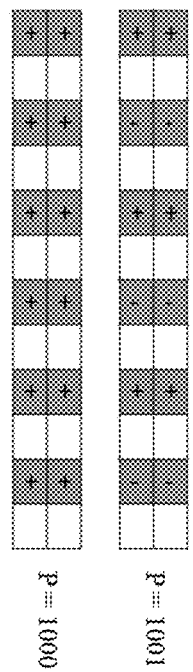
Figure 10:
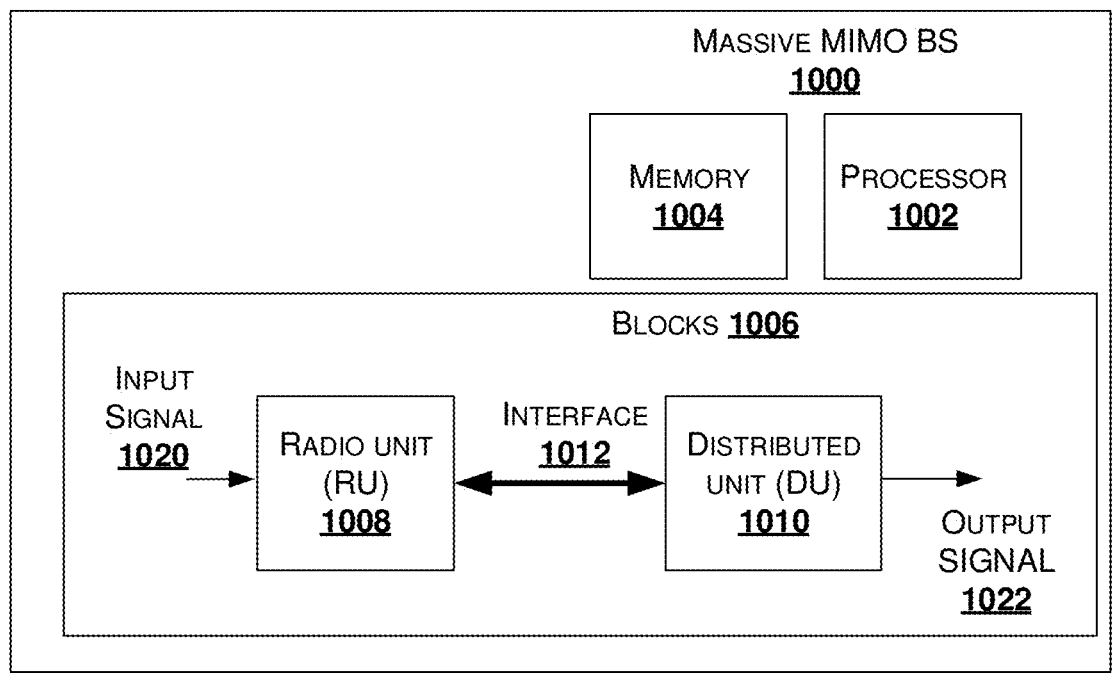
Figure 11:
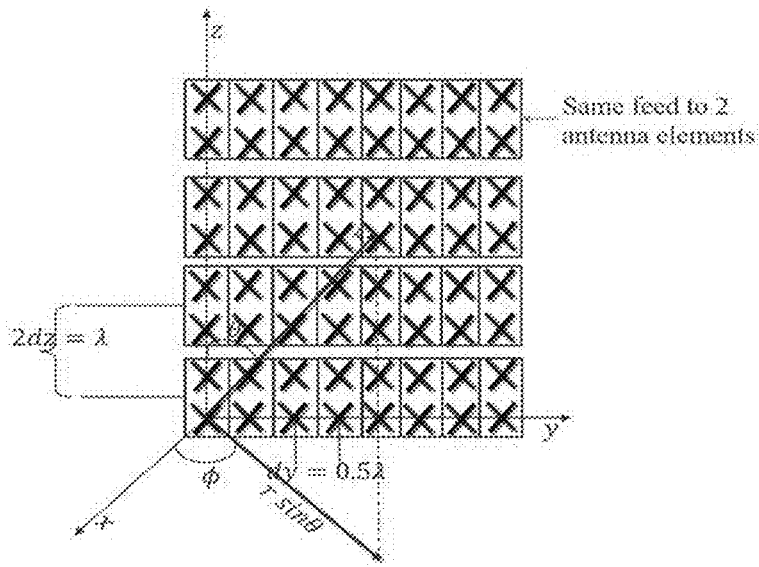
Figure 12A:
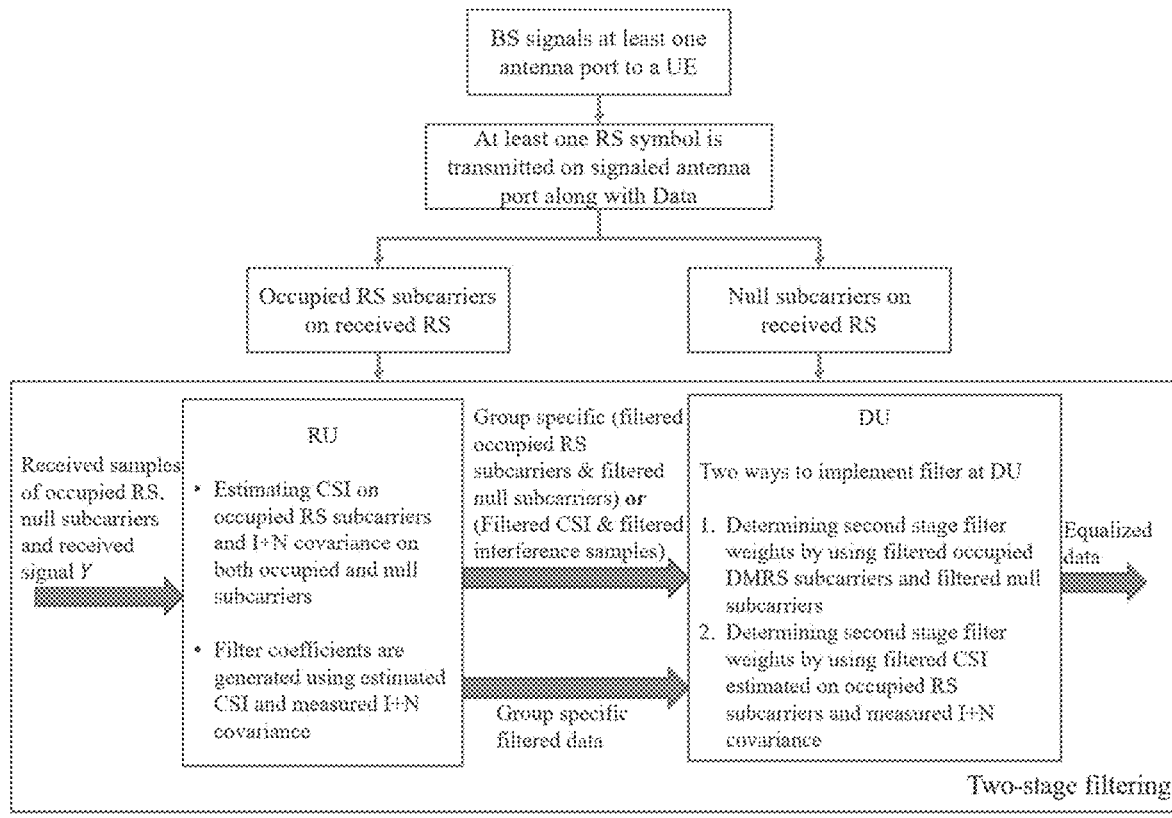
Figure 12B:
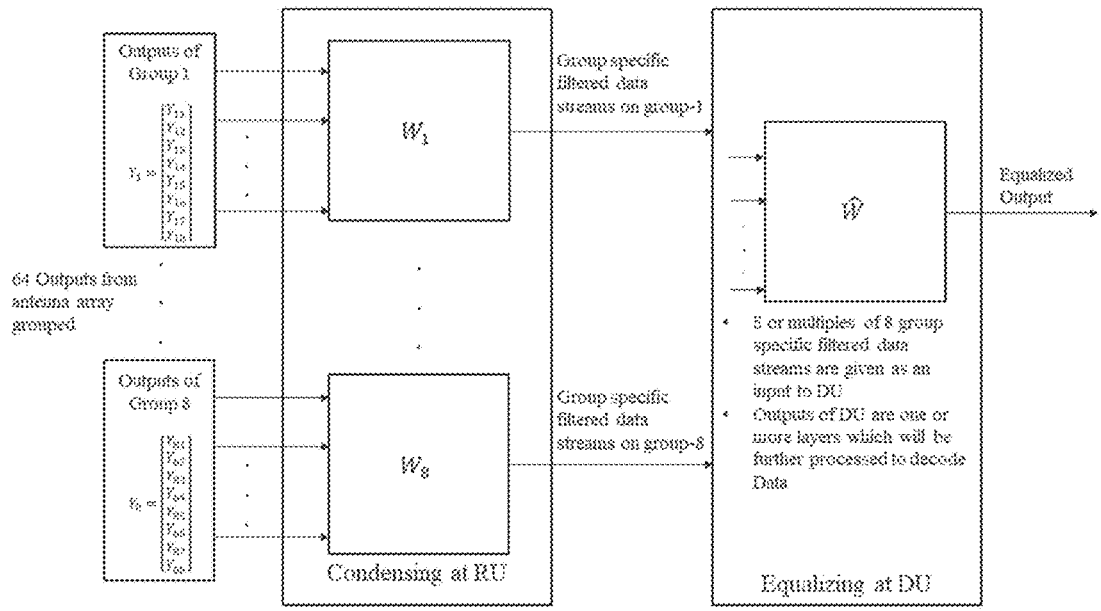
Figure 13:
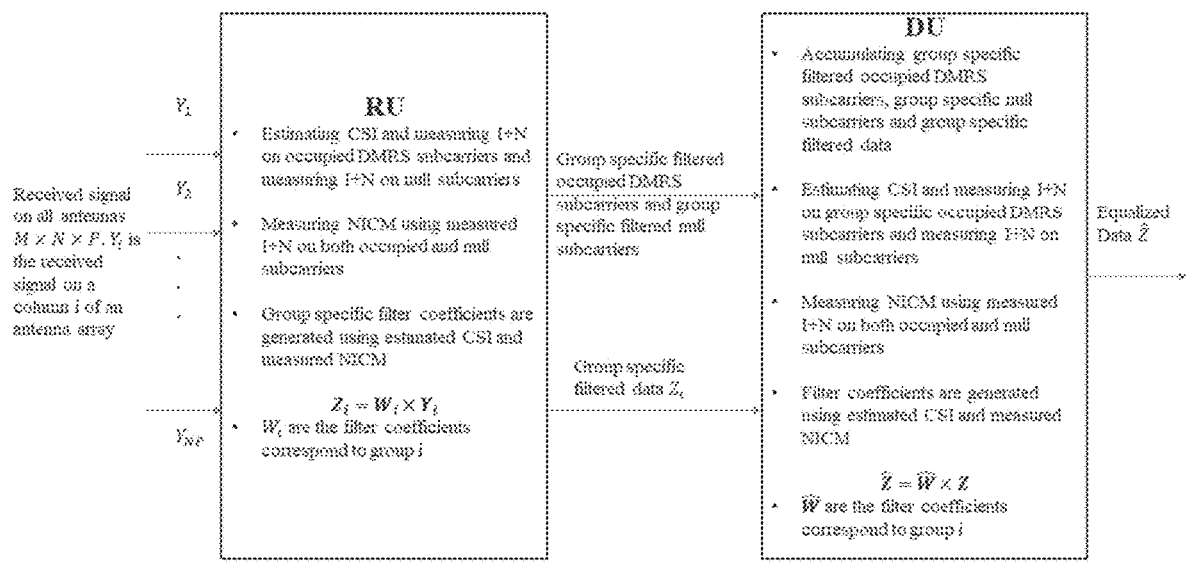
Figure 14:
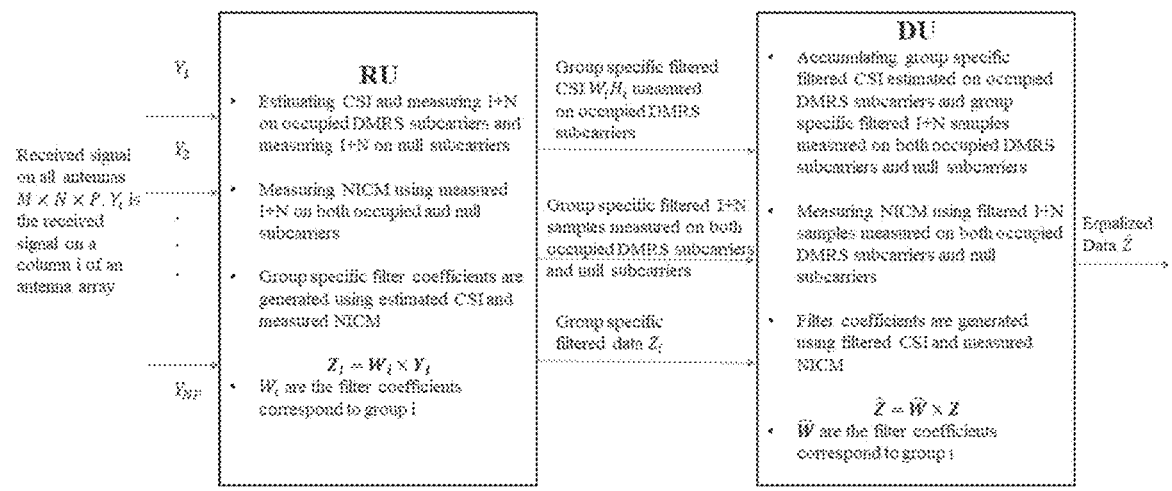
Figure 15A:
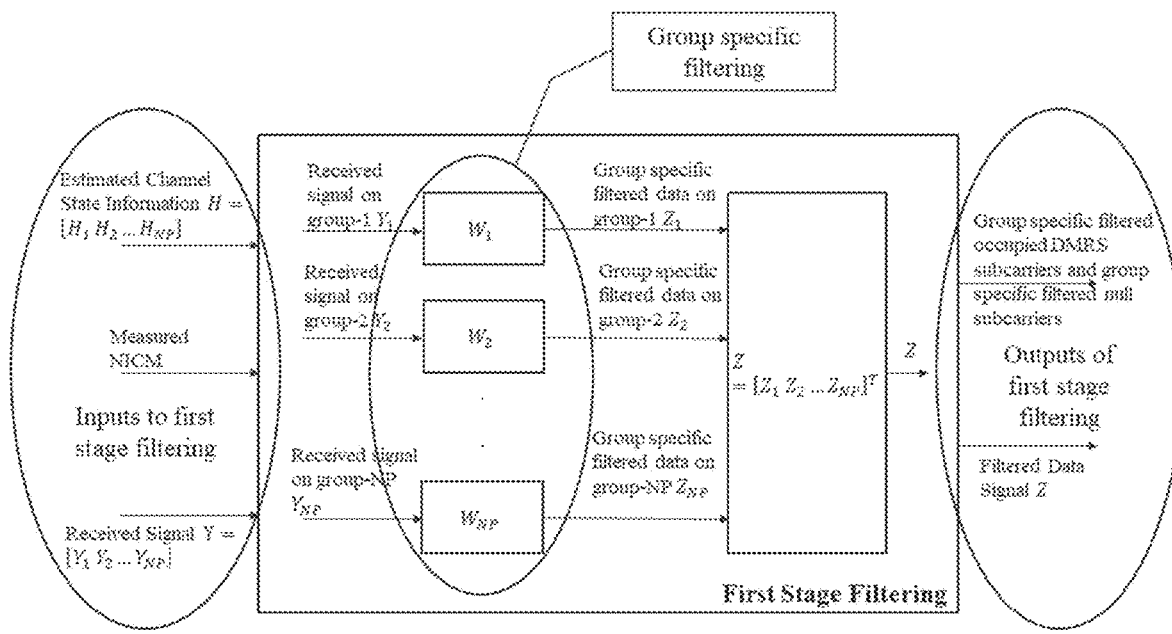
Figures 15B, 16A:
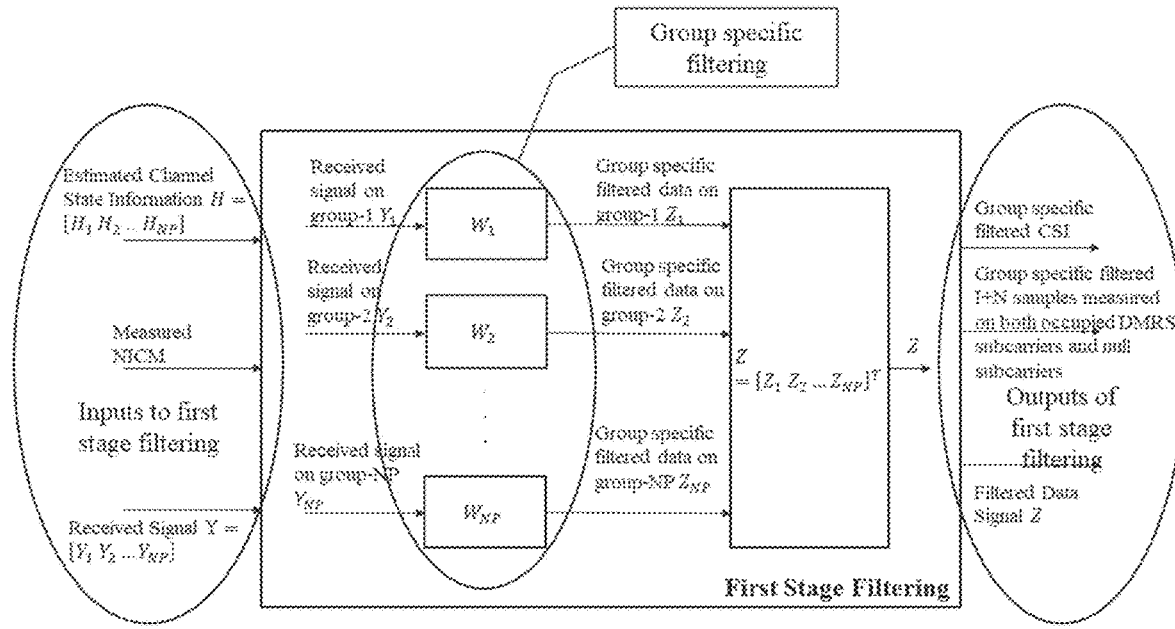
Figure 16B:
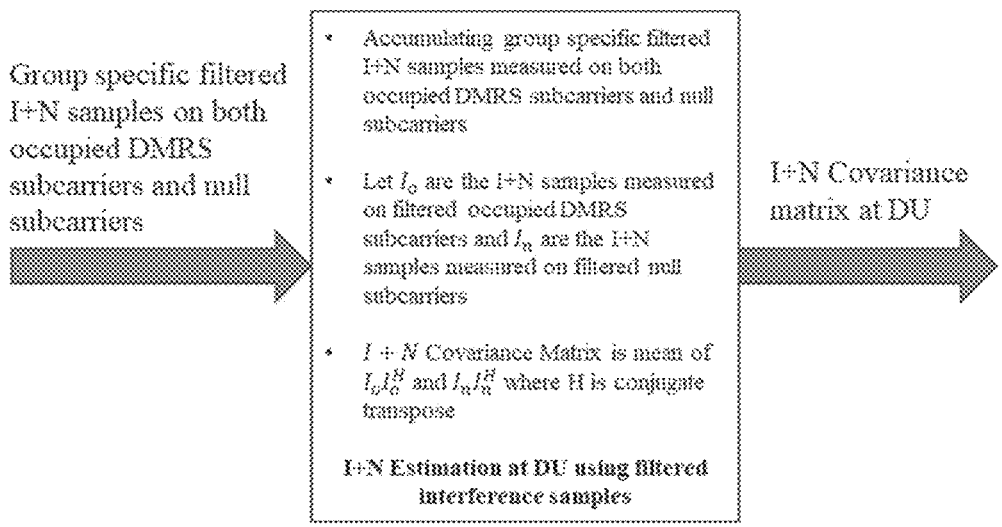
Figure 17:
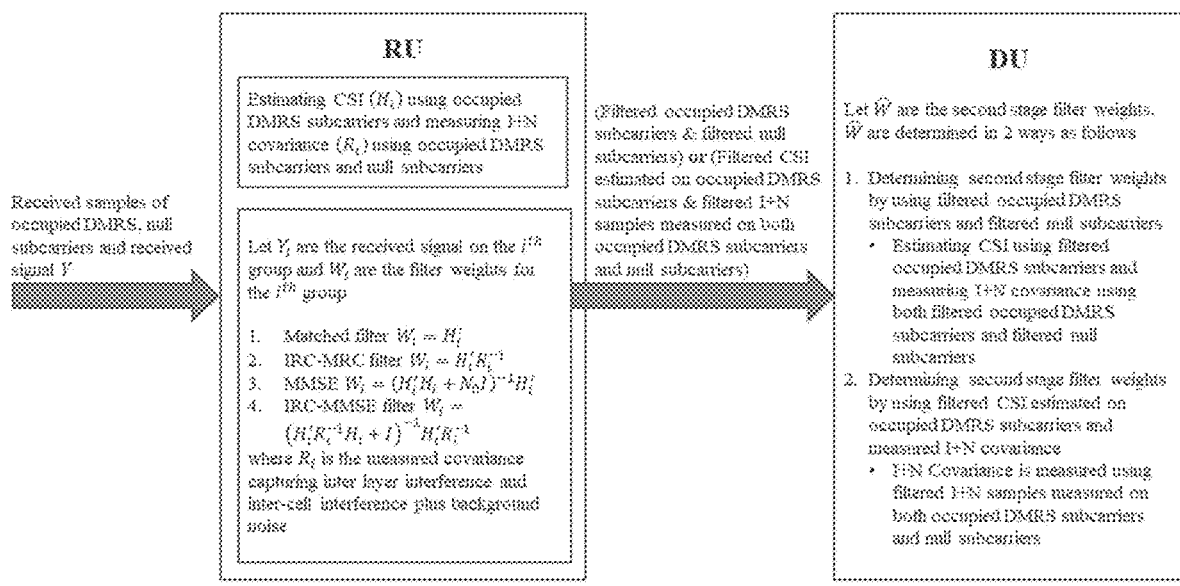
Figure 18:
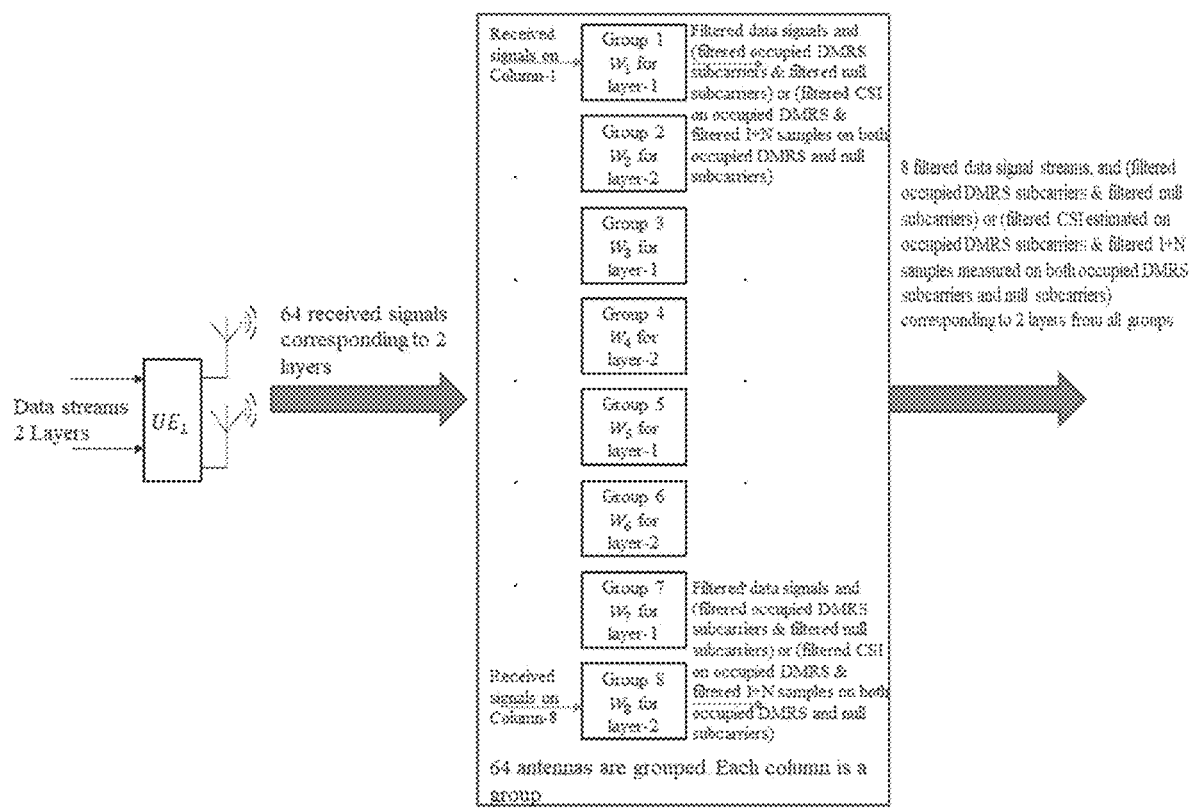
Figure 19:
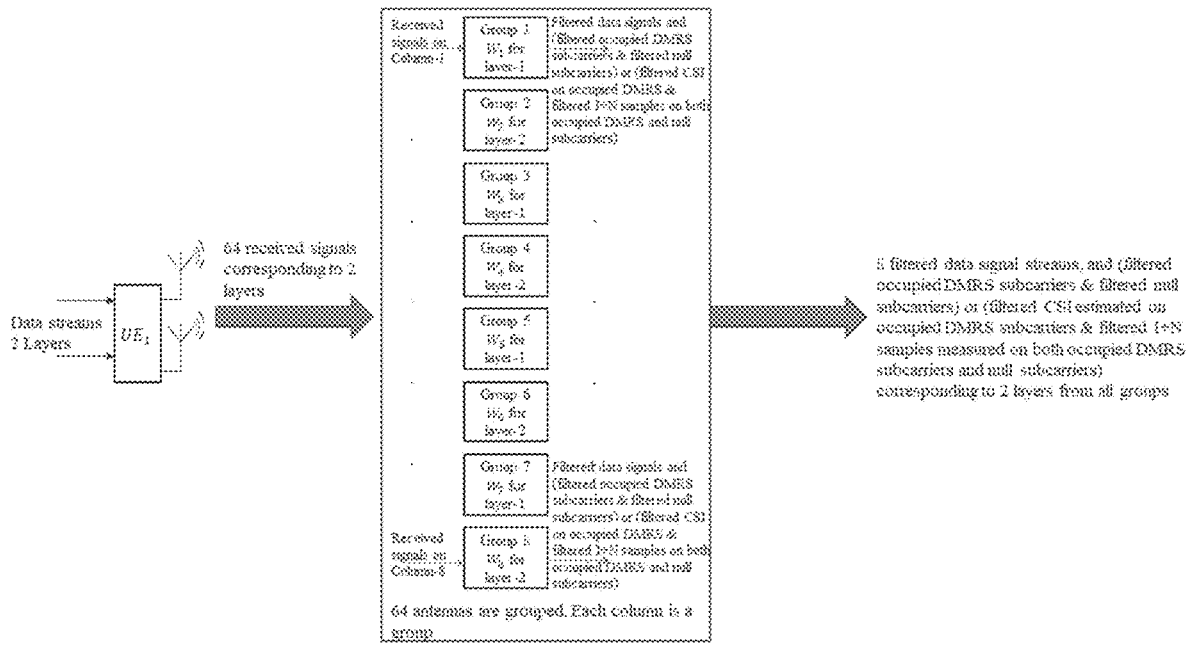
Figure 20:
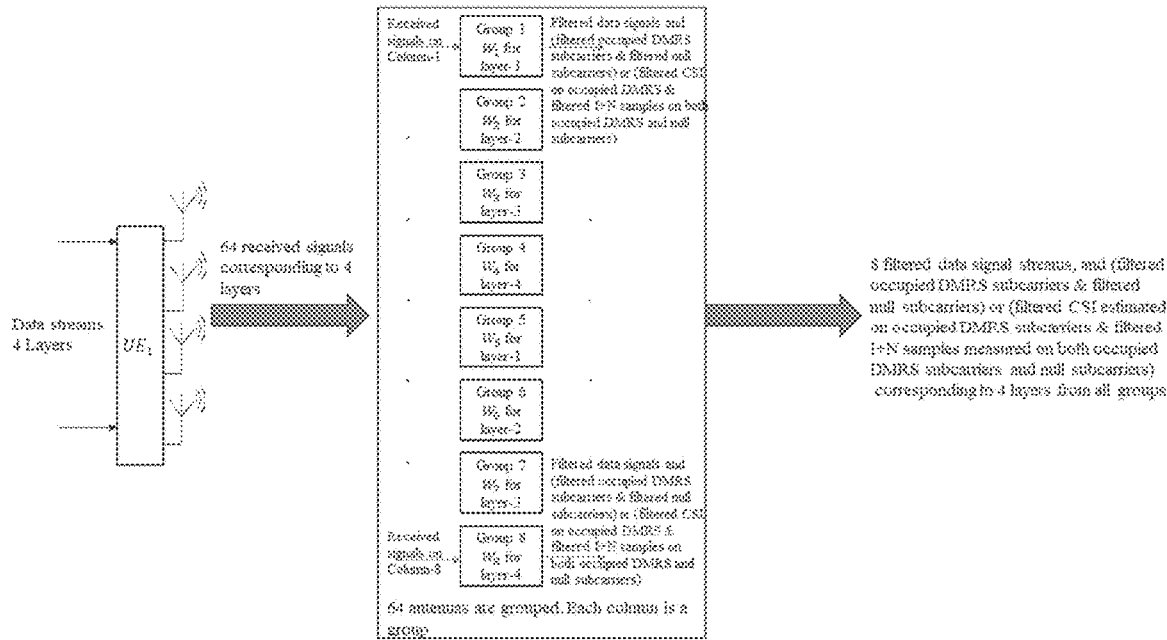
Figure 21:
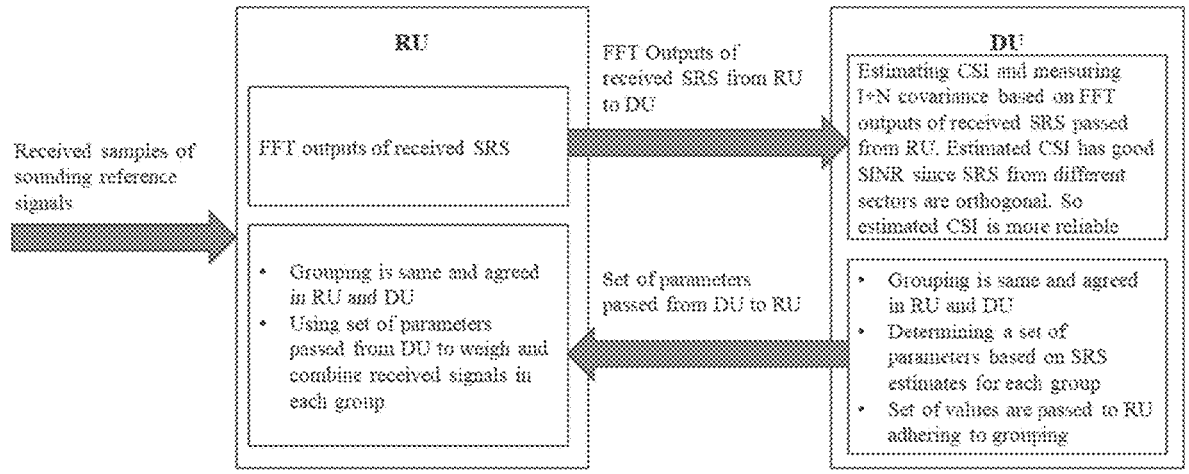
Figure 22:
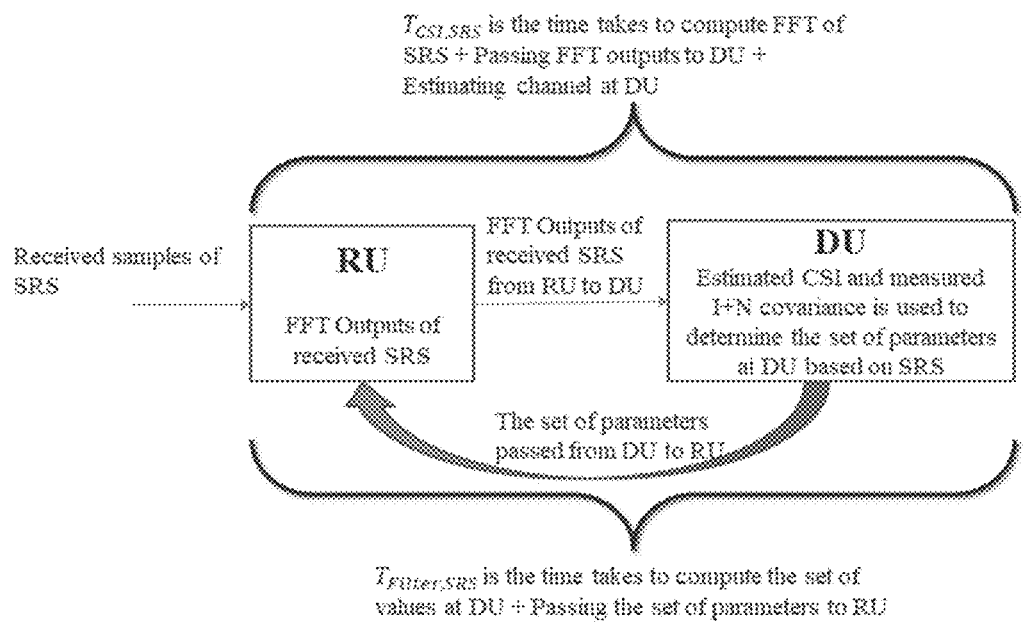
Figure 23:
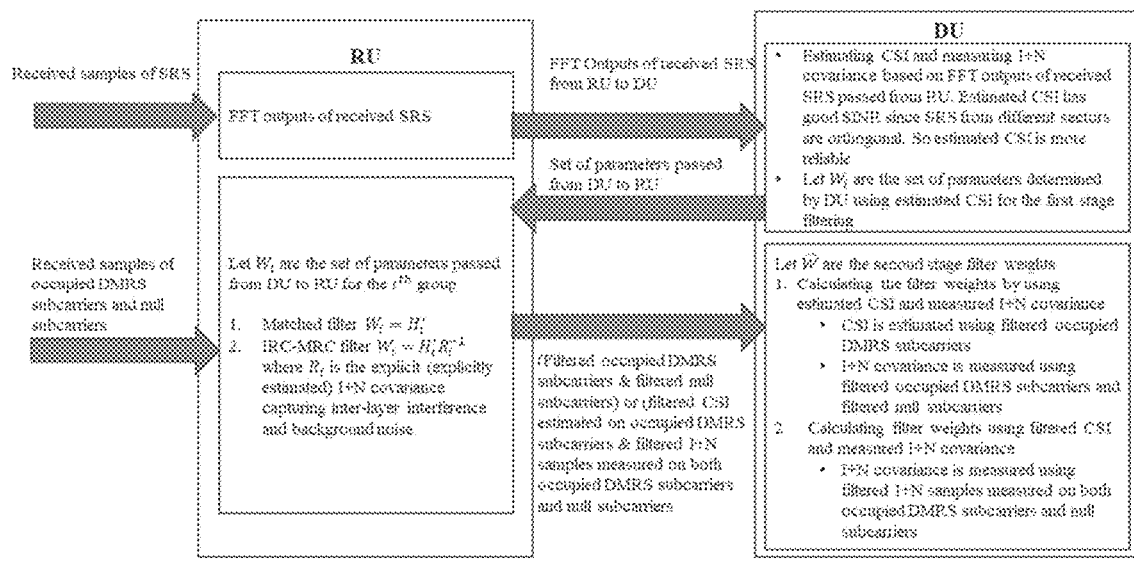
Figure 24:
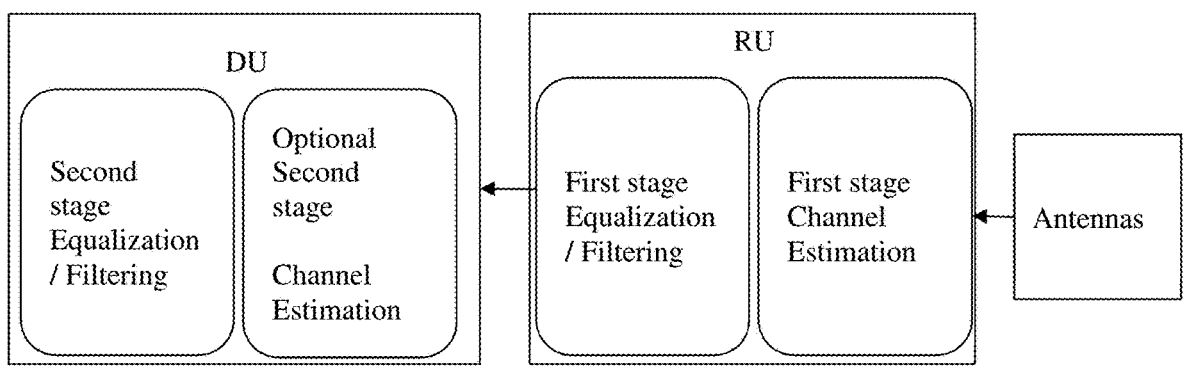
Figure 25:
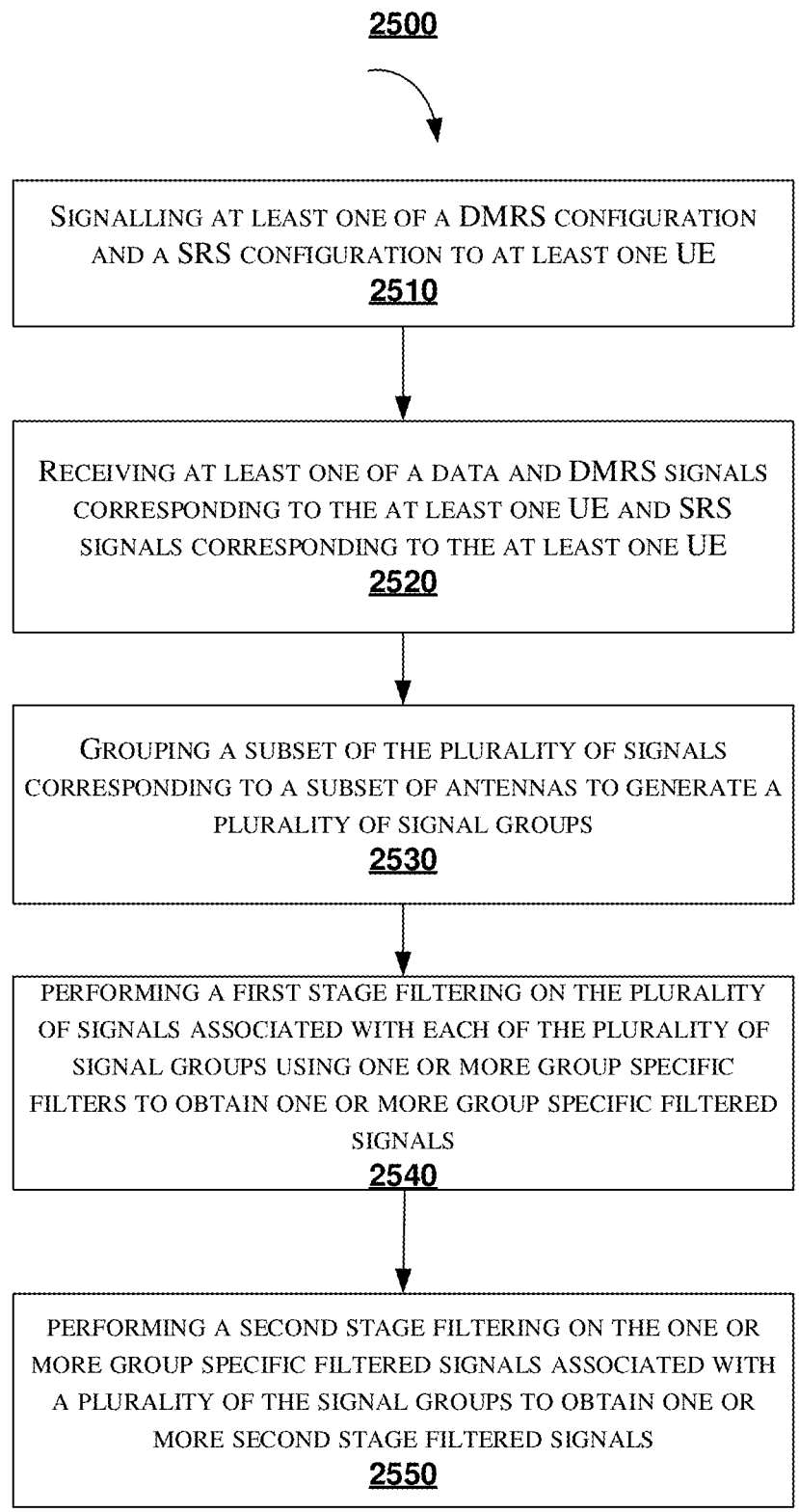

FIG. 4A port signaling based on cell ID for single layer single user (SU) multiple-input and multiple-output (MIMO);

FIG. 4B shows a block diagram of a base station (BS) for scheduling at least one user equipment (UE) in a communication network, in accordance with an embodiment of the present disclosure;

FIG. 5 shows a flowchart illustrating port signaling, channel state information (CSI) and I+N covariance estimation, and equalization, in accordance with an embodiment of the present disclosure;

FIG. 6 shows DMRS resource mapping for single layer SU-MIMO, in accordance with an embodiment of the present disclosure;

FIG. 7A shows an alternative port signaling for single layer SU-MIMO, in accordance with an embodiment of the present disclosure;

FIG. 7B shows an alternative port signaling for 2-layer transmission, in accordance with an embodiment of the present disclosure, in accordance with an embodiment of the present disclosure;

FIG. 8A shows a 4-layer transmission with single symbol DMRS, in accordance with an embodiment of the present disclosure;

FIG. 8B shows a port signaling for 4-layer transmission, in accordance with another embodiment of the present disclosure;

FIG. 9A shows single layer SU-MIMO with double symbol DMRS, in accordance with an embodiment of the present disclosure;

FIG. 9B shows a two layer SU-MIMO with double symbol DMRS, in accordance with an embodiment of the present disclosure;

FIG. 10 a block diagram of a Massive MIMO base station (BS) in a communication network, in accordance with an embodiment of the present disclosure;

FIG. 11 shows an illustration of an Antenna Array Structure, in accordance with an embodiment of the present disclosure;

FIG. 12A shows a flow chart illustrating how two-stage receiver condenses and equalizes received signal using occupied RS and null subcarriers when port signaling is enabled;

FIG. 12B shows a block diagram representation of performing condensing at the RU and the equalizing at the DU, in accordance with an embodiment of the present disclosure;

FIG. 13 shows a block diagram of RU-DU Split in two-stage filtering when group specific filtered occupied DMRS subcarriers and group specific filtered null subcarriers are passed from RU to DU for estimating CSI and measuring interference plus noise covariance at DU and group specific filtered data is passed from RU to DU for equalization at DU, in accordance with an embodiment of the present disclosure;

FIG. 14 shows a block diagram of RU-DU Split in two-stage filtering when group specific filtered CSI and group specific filtered I+N samples measured on both occupied DMRS subcarriers and null subcarriers are passed from RU to DU for measuring interference plus noise covariance at DU and group specific filtered data is passed from RU to DU for equalization at DU, in accordance with another embodiment of the present disclosure;

FIG. 15A shows an illustration of first stage filtering at the RU when group specific filtered occupied DMRS subcarriers, group specific filtered null subcarriers, and group specific filtered data are outputs of RU, in accordance with an embodiment of the present disclosure;

FIG. 15B shows an illustration of first stage filtering at the RU when group specific filtered CSI, group specific filtered I+N samples measured on both occupied DMRS subcarriers and null subcarriers and filtered data are outputs of RU, in accordance with another embodiment of the present disclosure;

FIG. 16A shows a block diagram representation of an interference plus noise covariance estimation at the DU using group specific filtered occupied DMRS subcarriers and group specific filtered null subcarriers, in accordance with an embodiment of the present disclosure;

FIG. 16B shows a block diagram representation of interference plus noise covariance estimation at the DU using group specific filtered I+N samples measured on both occupied DMRS subcarriers and null subcarriers, in accordance with an embodiment of the present disclosure;

FIG. 17 shows an illustration of two-stage filtering using DMRS based weights to perform first-stage filtering at RU and second-stage filtering at DU; in accordance with an embodiment of the present disclosure;

FIG. 18 shows an illustration of grouping in SU-MIMO with 2 layers, in accordance with an embodiment of the present disclosure;

FIG. 19 shows an illustration of grouping in SU-MIMO with 4 layers, in accordance with an embodiment of the present disclosure;

FIG. 20 shows an illustration of grouping in MU-MIMO with 2 users each with 2 layers, in accordance with an embodiment of the present disclosure;

FIG. 21 shows an illustration of two-stage filtering using SRS based weights at the RU to perform first-stage filtering;

FIG. 22 shows an illustration of delay introduced in the first-stage filtering when SRS based filter weights are used at the RU;

FIG. 23 shows an illustration of two-stage filtering using SRS based weights to perform first-stage filtering at the RU and DMRS based weights to perform second-stage filtering at DU;

FIG. 24 shows a block diagram illustration of filtering using a split of the DU and the RU, in accordance with an embodiment of the present disclosure; and FIG. 25 shows a flowchart illustrating a method for communication in a communication network, in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Embodiments of the present disclosure provide a method for communication in a communication network is provided. The communication network comprising a plurality of base stations (BSs) spatially distributed in a geographic region and at least one user equipment (UE) being connected to each of the plurality of BSs. The method comprising signaling by a BS at least one of a demodulation reference signal (DMRS) configuration and a sounding reference signal (SRS) configuration to at least one UE. The DMRS configuration comprises signaling at least one antenna port number from a plurality of antenna port numbers. The at least one antenna port number indicates location of occupied subcarriers and null subcarriers associated with a DMRS transmission of the at least one UE. The SRS configuration comprises signaling of parameters associated with a time, a frequency and a code. Also, the method comprises receiving at least one of a data and DMRS signals corresponding to the at least one UE by the BS. The data and the DMRS signals are being received on one or more receive antennas of the at least one BS; and SRS signals corresponding to the at least one UE. The SRS signals being received on one or more receive antennas of the at least one BS. The method further comprises grouping a subset of the plurality of signals corresponding to a subset of antennas to generate a plurality of signal groups, wherein signals associated with each of the plurality of signal groups is at least one of the data signals, and the DMRS signals. Furthermore, the method comprises performing a first stage filtering on the plurality of signals associated with each of the plurality of signal groups using one or more group specific filters to obtain one or more group specific filtered signals. The group specific filters are determined using a set of parameters. The set of parameters are determined based on one of the DMRS signals and the SRS signals. The set of parameters determined based on DMRS signals include channel values and interference values measured from occupied and null subcarriers associated with the signaled at least one antenna port number. The set of parameters determined based on SRS signals include channel values associated with the SRS configuration. Thereafter, the method comprises performing a second stage filtering by the BS on the one or more group specific filtered signals associated with a plurality of the signal groups to obtain one or more second stage filtered signals.

Figure 1:
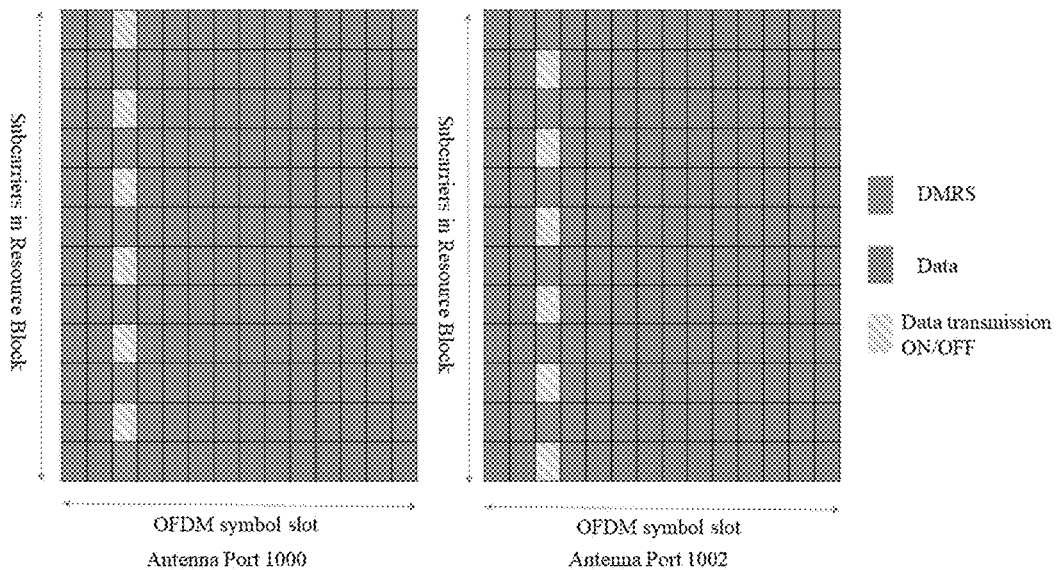
FIG. 1 shows an illustration of Type-1 demodulation reference signal (DMRS) Configuration in Fifth Generation New Radio (5G NR)
Figure 2A:
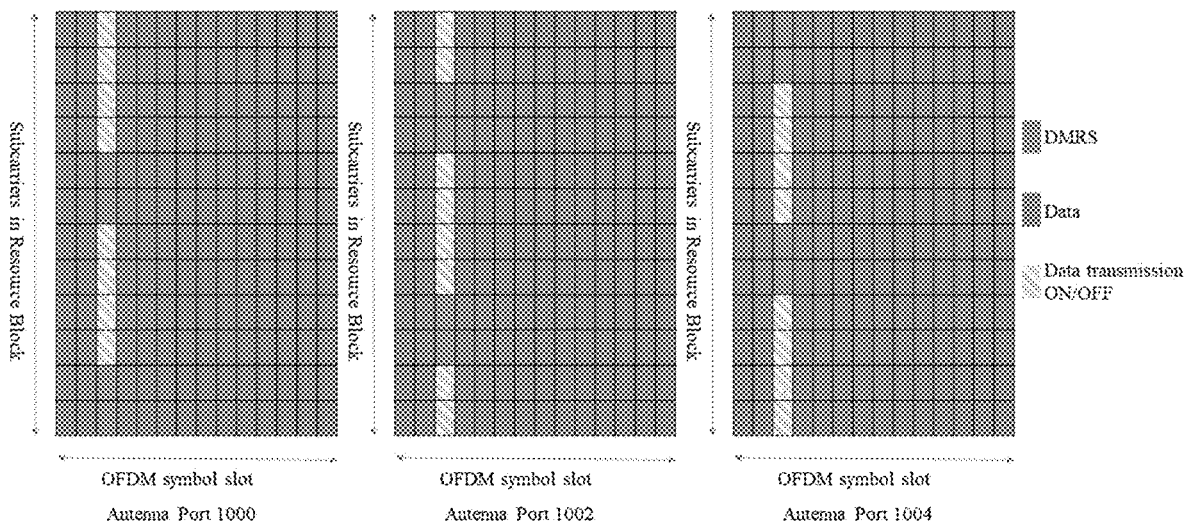
FIG. 2A shows an illustration of Type-2 DMRS Configuration in 5G NR.
Figure 2B:
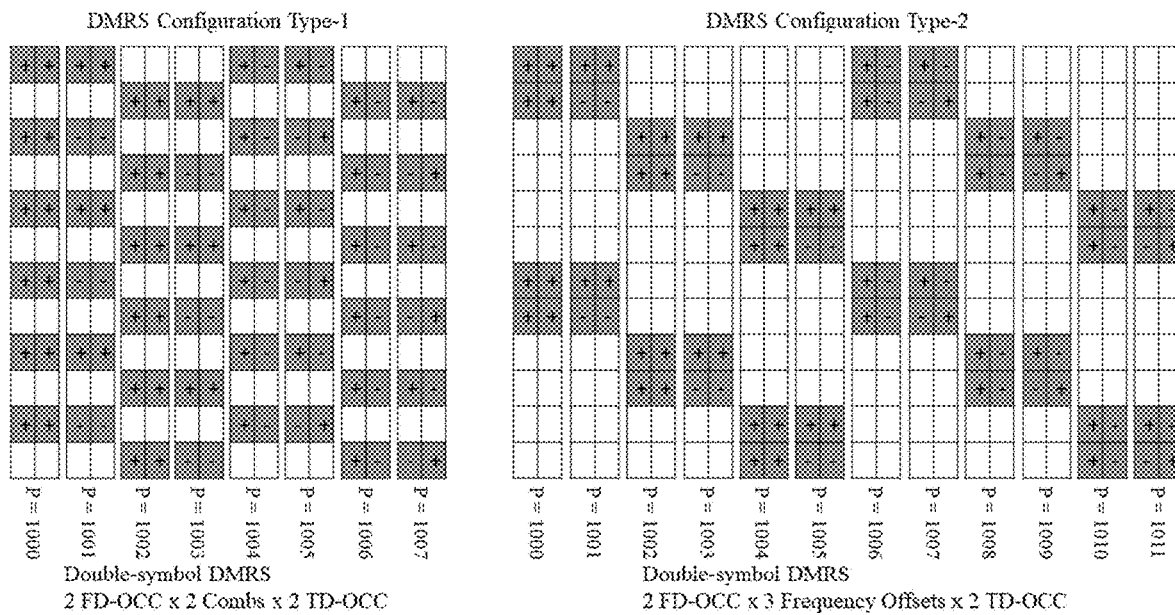
FIG. 2B shows an illustration of a maximum DMRS Ports in Type-1 and Type-2 DMRS configuration.
Figure 3:
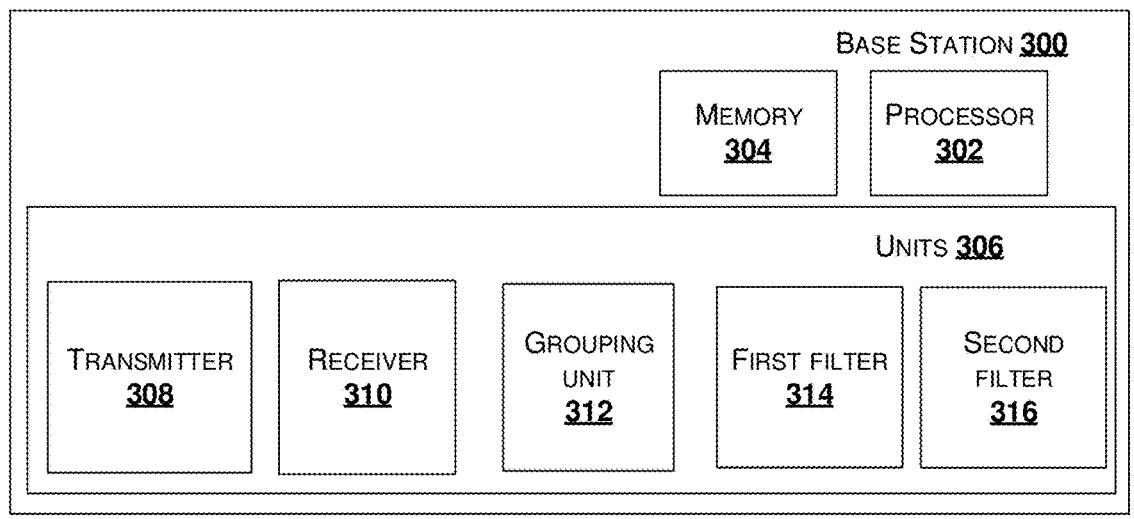
FIG. 3 shows a block diagram of a base station (BS) in a communication network, in accordance with an embodiment of the present disclosure.

FIG. 3 shows a block diagram of a base station (BS) in a communication network, in accordance with an embodiment of the present disclosure. The communication network comprises a plurality of BSs spatially distributed in a geographic region, and at least one UE being communicatively connected to each of the plurality of BSs.

As shown in FIG. 3, the BS 300 comprises a processor 302, and memory 304 coupled with the processor. The BS 300 may be referred as a multi-stage receiver or a communication system. The processor 302 may be configured to perform one or more functions of the BS 300 for communication in the communication network. In one implementation, the BS 300 may comprise blocks 306, also referred as modules or units 306 for performing various operations in accordance with the embodiments of the present disclosure. In an embodiment, the communication network comprising a plurality of BSs spatially distributed in a geographic region, and at least one UE being communicatively connected to a BS. The BS 300 comprises a plurality of antennas (not shown in the Figure).

The blocks 306 includes a transmitter 308, a receiver 310, a grouping unit 312, a first stage filter 314 and a second stage filter 316. For simplicity, the FIG. 3 shows a transmitter 308, however it includes a plurality of transmitters. Also, the receiver 310 may include a plurality of receivers.

The transmitter 308 signals at least one of a demodulation reference signal (DMRS) configuration and a sounding reference signal (SRS) configuration to at least one UE. The DMRS configuration comprises signaling at least one antenna port number from a plurality of antenna port numbers, the at least one antenna port number indicates location of occupied subcarriers and null subcarriers associated with a DMRS transmission of the at least one UE. The SRS configuration comprises signaling of parameters associated with a time, a frequency and a code. In an embodiment, location of occupied reference signals subcarriers and null subcarrier positions are selected with one of one OFDM symbol and one or more OFDM symbols. The location of occupied DMRS subcarriers and null subcarrier positions are associated with one of one OFDM symbol and one or more OFDM symbols. Each of the plurality of BSs signals at least one antenna port from a plurality of antenna port numbers to a connected UE, wherein the port number signaled by at least two BSs are distinct. Each of the plurality of BSs signals a SRS configuration using parameters associated with a time, a frequency and a code, wherein the SRS configuration signaled by at least two BSs are distinct.

The receiver 310 receives at least one of a data and DMRS signals corresponding to the at least one UE, and SRS signals corresponding to the at least one UE. The data and the DMRS signals are being received on one or more receive antennas of the at least one BS. The SRS signals being received on one or more receive antennas of the at least one BS. The DMRS comprises occupied DMRS subcarriers and null subcarriers, a location of occupied DMRS subcarriers and null subcarrier positions are selected according to signaled at least one antenna port.

The grouping unit 312 performs grouping of a subset of the plurality of signals corresponding to a subset of antennas to generate a plurality of signal groups. The signals associated with each of the plurality of signal groups is at least one of the data signals, and the DMRS signals.

The first stage filter 314 performs a first stage filtering on the plurality of signals associated with each of the plurality of signal groups using one or more group specific filters to obtain one or more group specific filtered signals. The group specific filtered signals comprise at least one of one or more group specific filtered data signals, one or more group specific filtered DMRS, one or more group specific filtered channel state information (CSI), and one or more group specific filtered interference plus noise signals.

The group specific filters are determined using a set of parameters, wherein said set of parameters are determined based on one of the DMRS signals and the SRS signals. The set of parameters are determined based on DMRS signals include channel values and interference values measured from occupied and null subcarriers associated with the signaled at least one antenna port number. The set of parameters are determined based on SRS signals include channel values associated with the SRS configuration.

The second stage filter 316 performs a second stage filtering on the one or more group specific filtered signals associated with a plurality of the signal groups to obtain one or more second stage filtered signals.

In an embodiment the first stage filtering and the second stage filtering is performed using a first stage filter and a second stage filter respectively, said first stage filter and said second stage filter are co-located in a co-located unit. The set of parameters are determined by the co-located unit. In an embodiment, the set of parameters determined based on DMRS signals include channel and interference values measured from occupied and null subcarriers associated with the signaled at least one antenna port number. The channel and interference values are determined by the co-located unit. In an embodiment, the second stage filtering is included in the co-located unit.

In an embodiment, the BS 300 comprises a distributed unit (DU) and at least one radio unit (RU). The first stage filtering is performed by a radio unit (RU) and the second stage filtering is performed by a distributed unit (DU). The set of parameters are determined by the DU are communicated to the RU using an interface. The channel values associated with the SRS configuration are channel values obtained by the DU. In an embodiment, the second stage filtering is included in the DU.

In an embodiment, the first stage filter 314 determines the one or more group specific filtered CSI and one or more group specific filtered interference parameters using the occupied subcarriers and null subcarriers associated with the group specific filtered DMRS, and the signaled at least one antenna port number. This includes obtaining one or more group specific filtered CSI from the first stage filtering, and one or more group specific filtered interference parameters from one or more group specific filtered interference plus noise signals. The second stage filtering comprises filtering of one or more group specific filtered data using one or more weights, said one or more weights are obtained using the one or more group specific filtered CSI and the one or more group specific filtered interference parameters.

Embodiments of the present disclosure provide method of communication using DMRS Port Signaling. An antenna port indicates an allocation of subcarriers and time domain symbols for a reference signal. FIG. 4A port signaling based on cell ID for single layer single user (SU) multiple-input and multiple-output (MIMO). As shown in FIG. 4A, for single layer SU-MIMO transmission, users in different sectors are assigned with alternative port numbers to avoid any collision. Port signaling can be made function of parameters like cell Id or user Id. For example, in a given cell site, first sector assigns port 2 to the user scheduled in the first sector, second sector assigns port 0 to the user scheduled in the second sector, and third sector assigns port 2 to the user scheduled in the third sector. By doing this, a user scheduled in the first sector will have interference only from the sectors that use port 2 for the user scheduled in those sectors. Similarly, a user scheduled in the second sector will have interference from the sectors that use port 0 for the user scheduled in those sectors. By doing this alternative port signaling, inter-cell interference can be reduced.

In order to achieve this reduction in inter-cell interference in single layer SU-MIMO scenario, a user has to send DMRS only on the port indicated to the UE (i.e., the subcarriers and symbol locations) and should not transmit either DMRS or data on the tones and symbols associated with the another port. That is, in DMRS configuration type-1, if a user sends DMRS on even subcarriers, it does not use odd subcarriers for any kind of transmission. Similar procedure is valid for a user sending DMRS on odd subcarriers.

FIG. 4B shows a block diagram of a base station (BS) in a communication network, in accordance with an embodiment of the present disclosure. The BS is a single stage receiver, in an embodiment. The communication network comprises a plurality of BSs spatially distributed in a geographic region, at least one UE being communicatively connected to a BS.

As shown in FIG. 4B, the BS 400 comprises a processor 402, and memory 404 coupled with the processor. The BS 400 may be referred as a single stage receiver or a communication system. The processor 402 may be configured to perform one or more functions of the BS 400 for communication in the communication network. In one implementation, the BS 400 may comprise blocks 406, also referred as modules or units 406 for performing various operations in accordance with the embodiments of the present disclosure. In an embodiment, the communication network comprising a plurality of BSs spatially distributed in a geographic region, and at least one UE being communicatively connected to a BS. The BS 400 comprises a plurality of antennas (not shown in the Figure).

The blocks 406 includes a transmitter 408, a receiver 410, an estimator 412 and an equalizer 414. In an embodiment, the transmitter 408 may comprise a plurality of transmitters. In an embodiment, the receiver 410 may comprise a plurality of receivers.

The transmitter 408 signals to the at least one UE with at least one antenna port number from a plurality of antenna port numbers, for reference signal (RS) transmission. In an embodiment, the RS is a demodulation reference signal (DMRS). In an embodiment, location of occupied RS subcarriers and null subcarrier positions are selected with one of one OFDM symbol and one or more OFDM symbols. Each of the plurality of BS signals at least one antenna port from a plurality of antenna port numbers to a connected UE. The port number signaled by at least two BS are distinct.

The receiver 410 receives a data and a RS corresponding to the at least one UE. The data and the RS are being received on one or more receive antennas of the BS 400. The RS comprises occupied RS subcarriers and null subcarriers, a location of occupied RS subcarriers and null subcarrier positions are selected according to signaled at least one antenna port.

The estimator 412, also referred as an estimation unit, estimates one or more channel parameters using the occupied subcarriers associated with the received RS, and interference parameters using the null subcarriers. The channel parameters and interference plus noise parameters are associated with one or more receive antennas of the BS. The channel parameters are channel state information (CSI) associated with the at least one connected UE. Also, the estimator 412 estimates an interference plus noise covariance using the interference plus noise parameters.

The equalizer 414, also referred as equalization unit or equalizer unit, equalizes the received data on the one or more receive antennas using the measured channel parameters and the interference parameters corresponding to the at least one signaled port for interference rejection and data detection. The equalizing includes one or more equalization coefficients that are determined using at least one of the CSI and the interference plus noise covariance. Thus, the inter-cell interference is reduced and reliability of the measured I+N covariance is increased.

FIG. 5 shows a flowchart illustrating port signaling, channel state information (CSI) and interference plus noise (I+N) covariance estimation, and equalization, in accordance with an embodiment of the present disclosure. As shown in FIG. 5, estimation of CSI and measuring of interference are performed on RS occupied subcarriers. Whereas on null subcarriers only interference is measured. The I+N covariance is estimated using measured interference. The estimated CSI and the I+N covariance are used for equalization.

Also, as shown in FIG. 5, estimation of I+N Covariance is performed by considering the following:

Let Y is the received signal on a given OFDM symbol and given subcarrier on all the antennas which will be of the form Y=HX+I+N is of the size $N_r \times 1$
where,
  $N_r$ are the number of receive antennas at base station
  H is the channel of size $N_r \times 1$ assuming one layer transmission from the user
  X is one of data and reference signals of size $1 \times 1$,
  I is the inter-cell interference of size $N_r \times 1$, and
  N is the background noise of size $N_r \times 1$
  All the variables are shown for a given sub-carrier in a given OFDM symbol.

$R_I = I \times I'$ is the measured covariance of interference plus noise. In some embodiments, interference covariance is measured only on the port that is assigned to a user in a particular sector.

FIG. 6 shows DMRS resource mapping for single layer SU-MIMO, in accordance with an embodiment of the present disclosure. As shown in FIG. 6, a single layer SU-MIMO transmission with alternative port signaling is assumed. When an alternate port signaling is enabled for single layer SU-MIMO, users from some sectors transmit DMRS on port 1000 and users from remaining sectors transmit DMRS on port 1002. Let say a sector j assigned port 1002 to the user scheduled in that sector, then base station estimates channel on even subcarriers, that is on subcarriers (0,2,4,6,8,10). Interference plus noise is measured on even subcarriers which will be of the form $$I_{even} = \sum_{i=1}^{N_{I,even}^j} H_{p,i}^{even} X_p + N$$

where, $N_{I,even}^j$ are the number of interfering sectors for the user scheduled in sector j, that is users from other sectors using as an example port 1002 i.e., even subcarriers for DMRS transmission, Where $H_{p,i}^{even}$ is the channel seen from a user from interfering sector i to the base station in sector j on even subcarriers, and $X_p$ is the DMRS symbols corresponds to the user in interfering sector i Similarly, interference plus noise measured on the odd subcarriers will be used for averaging. That is Interference plus noise is measured on even subcarriers which will be of the form $$I_{odd} = \sum_{i=1}^{N_{I,odd}^j} H_{p,i}^{odd} X_p + N$$

where, $N_{I,odd}^j$ are the number of interfering sectors in which user uses as an example port 1000 i.e., odd subcarriers for DMRS transmission where $H_{p,i}$ is the channel seen from a user from interfering sector i to the base station in sector j, and $X_p$ is the DMRS symbols corresponds to the user in interfering sector i $I_{even}$ and $I_{odd}$ are used to measure interference plus noise covariance $R_I$ One embodiment of the present disclosure is port signaling for combination-1 i.e. for One Layer SU-MIMO with Single Symbol DMRS.

FIG. 7A shows an alternative Port Signaling for single layer SU-MIMO, in accordance with an embodiment of the present disclosure. DMRS resource mapping for single layer SU-MIMO in case of DMRS configuration type-1 will be as shown in FIG. 7A. As shown in FIG. 7A, ports 1000 and 1001 are used for single layer SU-MIMO transmission. Users are alternatively assigned with port 1000 and 1001. Users with port 1000 DMRS experiences interference from the users from the other sectors which use port 1000 for DMRS transmission. Similarly, Users with port 1001 DMRS experiences interference from the users from the other sectors which use port 1001 for DMRS transmission.

For Estimation of interference plus noise covariance, assuming interference plus noise estimation on a given OFDM symbol within a PRB and estimation is done for a user with port 1000 assigned for DMRS transmission $$y_1 = h_1 p_1 + \sum_{l=1}^{L_1} g_l p_l' + n_1$$

$$I_1 = y_1 - h_1 p_1 \Rightarrow R_1 = I_1 \times I_1^H$$

Interference plus noise samples on null tones will be of the form $$y_2 = I_2 = \sum_{l=1}^{L_2} g_l p_l'' + n_2$$

$$R_2 = I_2 \times I_2^H$$

Where, $y_1$ is the received DMRS on 1st RE and $y_2$ is the received DMRS on 2nd RE, $I_1$ and $I_2$ are the estimated interference plus noise samples on 1st and 2nd RE, $R_1$ and $R_2$ are the estimated interference plus noise covariance matrices on 1st and 2nd RE, $L_1$ are the number of interfering users from other sectors that are assigned with port 1000 for DMRS transmission, $L_2$ are the number of interfering users from other sectors that are assigned with port 1002 for DMRS transmission.

Similarly, $R_i$s are calculated on all REs $$I + N \text{ covariance is } R_I = \frac{R_1 + R_2 + R_3 + \ldots + R_{12}}{12}$$

One embodiment of the present disclosure is a 2-Layer SU-MIMO Transmission with Single Symbol DMRS.

FIG. 7B shows an alternative port signaling for 2-layer transmission, in accordance with an embodiment of the present disclosure, in accordance with an embodiment of the present disclosure. For 2-layer SU-MIMO transmission, DMRS can be configured as follows in case of DMRS configuration type-1, i.e., 2-symbol DMRS can be configured with OCC for supporting 2-ports of a single UE. As shown in FIG. 7B, port signaling is done in such a way that inter-cell interference can be reduced for 2-layer transmission. Users in different sectors are alternatively assigned with ports (1000,1001) and (1002,1003). This kind of port signaling reduces inter-cell interference in case of 2-layer transmission. However, there would be inter-layer interference which needs to be mitigated.

One embodiment of the present disclosure is Interference plus noise covariance estimation. Considering interference plus noise estimation on a given OFDM symbol within a PRB and estimation is done for a user with ports 1000 and 1001 assigned for DMRS transmission $$y_1 = h_1 p_1 + h_2 p_2 + \sum_{l=1}^{L_1} g_{l,1} p_{l,1}' + g_{l,2} p_{l,2}' + n_1$$

$$y_3 = h_1 p_1 - h_2 p_2 + \sum_{l=1}^{L_1} g_{l,1} p_{l,1}' - g_{l,2} p_{l,2}' + n_3$$

$$I_1 = y_1 - (h_1 p_1 + h_2 p_2) \Rightarrow R_1 = I_1 \times I_1^H$$

$$I_3 = y_3 - (h_1 p_1 - h_2 p_2) \Rightarrow R_3 = I_3 \times I_3^H$$

Interference plus noise samples on null tones will be of the below form $$y_2 = I_2 = \sum_{l=1}^{L_2} g_{l,1}' p_{l,1}'' + g_{l,2}' p_{l,2}'' + n_2$$

$$R_2 = I_2 \times I_2^H$$

where, $y_1$ is the received DMRS on 1st RE, $y_2$ is the received DMRS on 2nd RE, and $y_3$ is the received DMRS on 3rd RE, $g_{l,1}$ is the channel seen on port 1000 from the user in sector 1 and $g_{l,2}$ is the channel seen on port 1001 from the user in sector 1

$I_1$, $I_2$, and $I_3$ are the estimated interference plus noise samples on 1st RE, 2nd RE and 3rd RE, $R_1$, $R_2$, and $R_3$ are the estimated interference plus noise covariance matrices on 1st RE, 2nd RE, and 3rd RE, $L_1$ are the number of interfering users from other sectors that are assigned with port 1000 and 1001 for DMRS transmission, $L_2$ are the number of interfering users from other sectors that are assigned with port 1002 and 1003 for DMRS transmission.

Similarly, $R_i$s are calculated on all REs $$I+N \text{ covariance is } R_I = \frac{R_1 + R_2 + R_3 + \ldots + R_{12}}{12}$$

One embodiment of the present disclosure is 4-Layer SU-MIMO Transmission with Single Symbol DMRS.

FIG. 8A shows a 4-layer transmission with single symbol DMRS, in accordance with an embodiment of the present disclosure. As shown in FIG. 8A, users in all the sectors are assigned with ports (1000,1001,1002,1003). For 4-layer SU-MIMO transmission, DMRS can be configured as follows in case of DMRS configuration type-1. There would be inter-layer interference and inter-cell interference which need to be mitigated.

For Interference plus noise covariance estimation, assuming that interference plus noise estimation on a given OFDM symbol is within a PRB and estimation is performed for a user with ports 1000, 1001, 1002 and 1003 assigned for DMRS transmission $$y_1 = h_1 p_1 + h_2 p_2 + \sum_{l=1}^{L} g_{l,1} p'_{l,1} + g_{l,2} p'_{l,2} + n_1$$

$$y_3 = h_1 p_1 - h_2 p_2 + \sum_{l=1}^{L} g_{l,1} p'_{l,1} - g_{l,2} p'_{l,2} + n_3$$

$$y_2 = h_3 p_1 + h_4 p_2 + \sum_{l=1}^{L} g_{l,3} p'_{l,1} - g_{l,4} p'_{l,2} + n_2$$

$$y_4 = h_3 p_1 - h_4 p_2 + \sum_{l=1}^{L} g_{l,3} p'_{l,1} - g_{l,4} p'_{l,2} + n_4$$

$$I_1 = y_1 - (h_1 p_1 + h_2 p_2) \Rightarrow R_1 = I_1 \times I_1^H$$

-continued $$I_3 = y_3 - (h_1 p_1 - h_2 p_2) \Rightarrow R_3 = I_3 \times I_3^H$$

$$I_2 = y_2 - (h_3 p_1 + h_4 p_2) \Rightarrow R_2 = I_2 \times I_2^H$$

$$I_4 = y_4 - (h_3 p_1 + h_4 p_2) \Rightarrow R_4 = I_4 \times I_4^H$$

where, $y_1$ is the received DMRS on 1st RE, $y_2$ is the received DMRS on 2nd RE, $y_3$ is the received DMRS on 3rd RE, and $y_4$ is the received DMRS on 4th RE $g_{l,1}$ is the channel seen on port 1000 from the user in sector l, $g_{l,2}$ is the channel seen on port 1001 from the user in sector l, $g_{l,3}$ is the channel seen on port 1002 from the user in sector l, and $g_{l,4}$ is the channel seen on port 1003 from the user in sector l $I_1$, $I_2$, $I_3$ and $I_4$ are the estimated interference plus noise samples on 1st RE, 2nd RE, 3rd RE, and 4th RE $R_1$, $R_2$, $R_3$, and $R_4$ are the estimated interference plus noise covariance matrices on 1st RE, 2nd RE, 3rd RE, and 4th RE L are the number of interfering users from other sectors Similarly, $R_i$s are calculated on all REs $$I+N \text{ covariance is } R_I = \frac{R_1 + R_2 + R_3 + \ldots + R_{12}}{12}$$

One embodiment of the present disclosure is Port signaling for combination-2, i.e. for 4-Layer Transmission with Double Symbol DMRS. For 4-layer SU-MIMO transmission, DMRS can be configured as follows in case of DMRS configuration type-1.

FIG. 8B shows a port signaling for 4-layer transmission, in accordance with another embodiment of the present disclosure. As shown in FIG. 8B, port signaling is done in such a way that inter-cell interference can be reduced for 4-layer transmission. Users in different sectors are alternatively assigned with ports (1000,1001,1004,1005) and (1002,1003,1006,1007). This kind of port signaling reduces inter-cell interference in case of 4-layer transmission. However, there would be inter-layer interference which needs to be mitigated.

For Interference plus noise covariance estimation, assuming that interference plus noise estimation on double symbol DMRS is within a PRB and estimation is performed for a user with ports 1000, 1001, 1004 and 1005 assigned for DMRS transmission $$y_{11} = h_1 p_1 + h_2 p_2 + h_3 p_3 + h_4 p_4 + \sum_{l=1}^{L_1} g_{l,1} p'_{l,1} + g_{l,2} p'_{l,2} + g_{l,3} p'_{l,3} + g_{l,4} p'_{l,4} + n_{11}$$

$$y_{12} = h_1 p_1 + h_2 p_2 - h_3 p_3 - h_4 p_4 + \sum_{l=1}^{L_1} g_{l,1} p'_{l,1} + g_{l,2} p'_{l,2} - g_{l,3} p'_{l,3} - g_{l,4} p'_{l,4} + n_{12}$$

$$y_{31} = h_1 p_1 - h_2 p_2 + h_3 p_3 - h_4 p_4 + \sum_{l=1}^{L_1} g_{l,1} p'_{l,1} - g_{l,2} p'_{l,2} - g_{l,3} p'_{l,3} + g_{l,4} p'_{l,4} + n_{31}$$

$$y_{32} = h_1 p_1 - h_2 p_2 - h_3 p_3 + h_4 p_4 + \sum_{l=1}^{L_1} g_{l,1} p'_{l,1} - g_{l,2} p'_{l,2} - g_{l,3} p'_{l,3} + g_{l,4} p'_{l,4} + n_{32}$$

$$y_{21} = \sum_{l=1}^{L_2} g'_{l,1} p''_1 + g'_{l,2} p''_2 + g'_{l,3} p''_3 + g'_{l,4} p''_4 + n_{21}$$

-continued $$y_{22} = \sum_{l=1}^{L_2} g'_{l,1} p''_1 + g'_{l,2} p''_2 - g'_{l,3} p''_3 - g'_{l,4} p''_4 + n_{22}$$

$$I_{11} = y_{11} - (h_1 p_1 + h_2 p_2 + h_3 p_3 + h_4 p_4) \Rightarrow R_{1,1} = I_{11} \times I_{11}^H$$

$$I_{12} = y_{12} - (h_1 p_1 + h_2 p_2 - h_3 p_3 - h_4 p_4) \Rightarrow R_{1,2} = I_{12} \times I_{12}^H$$

where, $y_{11}$ is the received DMRS on 1st RE in 1st symbol, $y_{12}$ is the received DMRS on 1st RE in 2nd symbol, $y_{31}$ is the received DMRS on 3rd RE in 1st symbol, and $y_{32}$ is the received DMRS on 3rd RE in 2nd symbol $g_{l,1}$ is the channel seen on port 1000 from the user in sector l, $g_{l,2}$ is the channel seen on port 1001 from the user in sector l, $g_{l,3}$ is the channel seen on port 1004 from the user in sector l, and $g_{l,4}$ is the channel seen on port 1005 from the user in sector l $I_{11}$ and $I_{12}$ are the estimated interference plus noise samples on 1st RE in 2 symbols, $I_{31}$ and $I_{32}$ are the estimated interference plus noise samples on 3rd RE in 2 symbols, and $I_{21}$ and $I_{22}$ are the estimated interference plus noise samples on 2nd RE in 2 symbols $R_{1,1}$ and $R_{1,2}$ are the estimated interference plus noise covariance matrices on 1st RE in 2 symbols, $R_{2,1}$ and $R_{2,2}$ are the estimated interference plus noise covariance matrices on 2nd RE in 2 symbols, and $R_{3,1}$ and $R_{3,2}$ are the estimated interference plus noise covariance matrices on 3rd RE in 2 symbols $L_1$ are the number of interfering users from other sectors that are assigned with ports 1000, 1001, 1004, and 1005 for DMRS transmission $L_2$ are the number of interfering users from other sectors that are assigned with ports 1002, 1003, 1006, and 1007 for DMRS transmission Similarly, $R_i$s are calculated on all REs from both symbols $$I + N \text{ covariance is } R_I = \frac{R_{1,1} + R_{1,2} + R_{2,1} + R_{2,2} + R_{31} + R_{32} + \ldots + R_{12,1} + R_{12,2}}{12 \times 2}$$

One embodiment of the present disclosure is 1-Layer and 2-Layer SU-MIMO transmission with Double Symbol DMRS. 1-Layer and 2-Layer SU-MIMO transmission can be seen as a subset of 4-Layer SU-MIMO transmission. DMRS can be configured as follows in case of DMRS configuration type-1.

FIG. 9A shows single layer SU-MIMO with double symbol DMRS, in accordance with an embodiment of the present disclosure. FIG. 9B shows a two layer SU-MIMO with double symbol DMRS, in accordance with an embodiment of the present disclosure. As shown in FIGS. 11 and 12, port signaling is performed such that the inter-cell interference can be reduced for 1-layer and 2-layer SU-MIMO transmission. For example, users in some sectors are assigned with port 1000 for 1-layer SU-MIMO transmission and ports (1000,1001) for 2-layer SU-MIMO transmission. Users in some other sectors are assigned with port 1002 for 1-layer SU-MIMO transmission and ports (1002,1003) for 2-layer SU-MIMO transmission. This kind of port signaling reduces inter-cell interference in case of 1-layer and 2-layer SU-MIMO transmission. Also, the port signaling facilitates in better channel estimation with more DMRS REs and better interference plus noise covariance estimation with more null tones. However, there would be inter-layer interference in case of 2-layer SU-MIMO transmission which needs to be mitigated.

Interference plus noise covariance estimation for 1-Layer SU-MIMO, assuming interference plus noise estimation on double symbol DMRS within a PRB and estimation is performed for a user with port 1000 assigned for DMRS transmission $$y_{11} = h_1 p_1 + h_2 p_2 + \sum_{l=1}^{L_1} g_{l,1} p'_{l,1} + g_{l,2} p'_{l,2} + g_{l,3} p'_{l,3} + g_{l,4} p'_{l,4} + n_{11}$$

$$y_{12} = h_1 p_1 + h_2 p_2 + \sum_{l=1}^{L_1} g_{l,1} p'_{l,1} + g_{l,2} p'_{l,2} - g_{l,3} p'_{l,3} - g_{l,4} p'_{l,4} + n_{12}$$

$$y_{31} = h_1 p_1 - h_2 p_2 + \sum_{l=1}^{L_1} g_{l,1} p'_{l,1} - g_{l,2} p'_{l,2} - g_{l,3} p'_{l,3} + g_{l,4} p'_{l,4} + n_{31}$$

$$y_{32} = h_1 p_1 - h_2 p_2 + \sum_{l=1}^{L_1} g_{l,1} p'_{l,1} - g_{l,2} p'_{l,2} - g_{l,3} p'_{l,3} + g_{l,4} p'_{l,4} + n_{32}$$

$$y_{21} = \sum_{l=1}^{L_2} g'_{l,1} p''_1 + g'_{l,2} p''_2 + g'_{l,3} p''_3 + g'_{l,4} p''_4 + n_{21}$$

-continued $$y_{22} = \sum_{l=1}^{L_2} g'_{l,1} p''_1 + g'_{l,2} p''_2 - g'_{l,3} p''_3 - g'_{l,4} p''_4 + n_{22}$$

$$I_{11} = y_{11} - h_1 p_1 \Rightarrow R_{1,1} = I_{11} \times I_{11}^H$$

$$I_{12} = y_{12} - h_1 p_1 \Rightarrow R_{1,2} = I_{12} \times I_{12}^H$$

$$I_{31} = y_{31} - h_1 p_1 \Rightarrow R_{3,1} = I_{31} \times I_{31}^H$$

$$I_{32} = y_{32} - h_1 p_1 \Rightarrow R_{3,2} = I_{32} \times I_{32}^H$$

$$I_{21} = y_{21} \Rightarrow R_{2,1} = I_{21} \times I_{21}^H$$

$$I_{22} = y_{22} \Rightarrow R_{2,2} = I_{22} \times I_{22}^H$$

where, $y_{11}$ is the received DMRS on 1st RE in 1st symbol, $y_{12}$ is the received DMRS on 1st RE in 2nd symbol, $y_{31}$ is the received DMRS on 3rd RE in 1st symbol, and $y_{32}$ is the received DMRS on 3rd RE in 2nd symbol $g_{l,1}$ is the channel seen on port 1000 from the user in sector l, $g_{l,2}$ is the channel seen on port 1001 from the user in sector l, $g_{l,3}$ is the channel seen on port 1004 from the user in sector l, and $g_{l,4}$ is the channel seen on port 1005 from the user in sector l $I_{11}$ and $I_{12}$ are the estimated interference plus noise samples on 1st RE in 2 symbols, $I_{31}$ and $I_{32}$ are the estimated interference plus noise samples on 3rd RE in 2 symbols, and $I_{21}$ and $I_{22}$ are the estimated interference plus noise samples on 2nd RE in 2 symbols $R_{1,1}$ and $R_{1,2}$ are the estimated interference plus noise covariance matrices on 1st RE in 2 symbols, $R_{2,1}$ and $R_{2,2}$ are the estimated interference plus noise covariance matrices on 2nd RE in 2 symbols, and $R_{3,1}$ and $R_{3,2}$ are the estimated interference plus noise covariance matrices on 3rd RE in 2 symbols, $L_1$ are the number of interfering users from other sectors that are assigned with port 1000 for DMRS transmission, $L_2$ are the number of interfering users from other sectors that are assigned with ports 1002, 1003, 1006, and 1007 for DMRS transmission.

Similarly, $R_i$s are calculated on all REs from both symbols $$I + N \text{ covariance is } R_I = \frac{R_{1,1} + R_{1,2} + R_{2,1} + R_{2,2} + R_{3,1} + R_{3,2} + \ldots + R_{12,1} + R_{12,2}}{12 \times 2}$$

Interference plus noise covariance estimation for 2-Layer SU-MIMO is performed, assuming interference plus noise estimation on double symbol DMRS within a PRB and estimation is performed for a user with ports 1000 and 1001 assigned for DMRS transmission $$y_{11} = h_1 p_1 + h_2 p_2 + \sum_{l=1}^{L_1} g_{l,1} p'_{l,1} + g_{l,2} p'_{l,2} + g_{l,3} p'_{l,3} + g_{l,4} p'_{l,4} + n_{11}$$

$$y_{12} = h_1 p_1 + h_2 p_2 + \sum_{l=1}^{L_1} g_{l,1} p'_{l,1} + g_{l,2} p'_{l,2} - g_{l,3} p'_{l,3} - g_{l,4} p'_{l,4} + n_{12}$$

-continued $$y_{31} = h_1 p_1 - h_2 p_2 + \sum_{l=1}^{L_1} g_{l,1} p'_{l,1} - g_{l,2} p'_{l,2} - g_{l,3} p'_{l,3} + g_{l,4} p'_{l,4} + n_{31}$$

$$y_{32} = h_1 p_1 - h_2 p_2 + \sum_{l=1}^{L_1} g_{l,1} p'_{l,1} - g_{l,2} p'_{l,2} - g_{l,3} p'_{l,3} + g_{l,4} p'_{l,4} + n_{32}$$

$$y_{21} = \sum_{l=1}^{L_2} g'_{l,1} p''_1 + g'_{l,2} p''_2 + g'_{l,3} p''_3 + g'_{l,4} p''_4 + n_{21}$$

$$y_{22} = \sum_{l=1}^{L_2} g'_{l,1} p''_1 + g'_{l,2} p''_2 - g'_{l,3} p''_3 - g'_{l,4} p''_4 + n_{22}$$

$$I_{11} = y_{11} - (h_1 p_1 + h_2 p_2) \Rightarrow R_{1,1} = I_{11} \times I_{11}^H$$

$$I_{12} = y_{12} - (h_1 p_1 + h_2 p_2) \Rightarrow R_{1,2} = I_{12} \times I_{12}^H$$

$$I_{31} = y_{31} - (h_1 p_1 - h_2 p_2) \Rightarrow R_{3,1} = I_{31} \times I_{31}^H$$

$$I_{32} = y_{32} - (h_1 p_1 - h_2 p_2) \Rightarrow R_{3,2} = I_{32} \times I_{32}^H$$

-continued $$I_{21} = y_{21} \Rightarrow R_{2,1} = I_{21} \times I_{21}^H$$

$$I_{22} = y_{22} \Rightarrow R_{2,2} = I_{22} \times I_{22}^H$$

where, $y_{11}$ is the received DMRS on 1st RE in 1st symbol, $y_{12}$ is the received DMRS on 1st RE in 2nd symbol, $y_{31}$ is the received DMRS on 3rd RE in 1st symbol, and $y_{32}$ is the received DMRS on 3rd RE in 2nd symbol $g_{l,1}$ is the channel seen on port 1000 from the user in sector l, $g_{l,2}$ is the channel seen on port 1001 from the user in sector l, $g_{l,3}$ is the channel seen on port 1004 from the user in sector l, and $g_{l,4}$ is the channel seen on port 1005 from the user in sector l $I_{11}$ and $I_{12}$ are the estimated interference plus noise samples on 1st RE in 2 symbols, $I_{31}$ and $I_{32}$ are the estimated interference plus noise samples on 3rd RE in 2 symbols, and $I_{21}$ and $I_{22}$ are the estimated interference plus noise samples on 2nd RE in 2 symbols $R_{1,1}$ and $R_{1,2}$ are the estimated interference plus noise covariance matrices on 1st RE in 2 symbols, $R_{2,1}$ and $R_{2,2}$ are the estimated interference plus noise covariance matrices on 2nd RE in 2 symbols, and $R_{3,1}$ and $R_{3,2}$ are the estimated interference plus noise covariance matrices on 3rd RE in 2 symbols, $L_1$ are the number of interfering users from other sectors that are assigned with ports 1000 and 1001 for DMRS transmission, $L_2$ are the number of interfering users from other sectors that are assigned with ports 1002, 1003, 1006, and 1007 for DMRS transmission.

Similarly, $R_i$s are calculated on all REs from both symbols $$I + N \text{ covariance is } R_I = \frac{R_{1,1} + R_{1,2} + R_{2,1} + R_{2,2} + R_{3,1} + R_{3,2} + \ldots + R_{12,1} + R_{12,2}}{12 \times 2}$$

FIG. 10 a block diagram of a Massive MIMO base station (BS) in a communication network, in accordance with an embodiment of the present disclosure.

As shown in FIG. 10, the Massive MIMO BS 1000, is referred as a BS, comprises a processor 1002, and a memory 1004 coupled with the processor. The BS 1000 may also be referred as a receiver or a transceiver or a communication system. The processor may be configured to perform one or more functions of the BS 1000 for receiving input and processing the same. In one implementation, the BS 1000 may comprise blocks 1006, also referred to as modules or units, for performing various operations in accordance with the embodiments of the present disclosure.

The unit 1006 includes at least one radio unit (RU) 1008, at least one distributed unit (DU) 1010, an interface 1012, and a plurality of antennas (not shown in the figure). In an embodiment, the BS 1000 is configured to process received input signal 1020 and generate an output signal 1022. The received input signal is one of a signal stream, a plurality of signals, one or more signal streams and at least one signal.

The at least one of RU is referred as RU. The at least one of DU is referred as DU. The interface is a fronthaul interface. In an embodiment, the first stage filtering and the second stage filtering are performed in the RU and the DU respectively, wherein the RU and the DU are co-located.

The RU 1008 is configured to receive a plurality of signals corresponding to the plurality of antennas. The plurality of signals comprises at least one of data signals, demodulation reference signals (DMRS) and sounding reference signals (SRS). Thereafter, the RU 1008 performs grouping operation on a subset of the plurality of signals, corresponding to a subset of antennas of a group, to generate a plurality of signal groups. The plurality of signals associated with each group is at least one of the data signals, the DMRS and the SRS. In an embodiment, the signals associated with each of the plurality of signal groups comprises at least one user. The at least one user includes at least one layer.

In an embodiment, the grouping performed on the received signal streams such that each sub-group comprises signals corresponding to a distinct set of antennas. For example, the received signal streams associated with the antennas of any vertical column of a given polarization may belong to one group. With 64-antennas, there may have 8 groups with 8-antennas streams of a given column per group.

After the grouping operation, the RU 1008 performs a first stage filtering on the plurality of signal groups associated with each group using one or more group specific filters to obtain one or more group specific filtered signals. The first stage filtering is also referred as group specific filtering of the signals associated with a given group. The filter coefficients of a given group are obtained using at least one of estimated channel state information and estimated noise-plus-interference covariance associated with the received signals of the group. The first stage filtering or group specific filtering would result in one output per group per layer. The output comprises of group specific filtered data and group specific filtered reference signals The group specific filters are determined using at least one of the signals associated with the group, and a set of values communicated by the DU 1010 to the RU 1008. The set of values are determined by the DU 1010 based on SRS or predetermined values. The predetermined values are obtained using group specific Discrete Fourier Transform (DFT) weights. The group specific DFT weights include a group specific steering angle. In an embodiment, the predetermined values are obtained using one or more group specific weights that are selected from a code book. In an embodiment, the set of values determined by the DU 1010 based on the SRS, are associated with a subset of users and a subset of layers, wherein one or more group specific signals of a group are weighed and combined using the set of values to obtain one or more group specific filtered signals.

Each one of the one or more group specific filters of a group is associated with a subset of users and a subset of layers associated with a subset of users. The union of the subsets of users and the subsets of layers comprises the set of all the users and all the layers associated with the plurality of signals. Also, the one or more group specific filters of a group is associated with a single user and one of multiple layers of said single user. In an embodiment, the one or more group specific filters of a group is associated with one of multiple users, and one of multiple layers of the one of multiple users.

In an embodiment, each one of the one or more group specific filters associated with a user and a layer is obtained using one of a group specific, a user specific and a layer specific matched filter; a group specific, a user specific and a layer specific minimum mean square error (MMSE) filter; and a group specific, a user specific and a layer specific MMSE Interference Rejection Combining (IRC) filter.

In an embodiment, each one of the one or more group specific filters is a matched filter. The matched filter is associated with one user and one layer, wherein union of said user and said layer comprises a set of all the users and all the layers associated with the plurality of signals. The matched filter weights are determined using one of the SRS and the DMRS.

The one or more group specific filtered signals comprises one or more group specific filtered data signals, one or more group specific filtered DMRS, one or more group specific filtered CSI, and one or more group specific filtered interference plus noise signals.

In an embodiment, the DU 1010 also performs grouping operation on a subset of the plurality of signals, corresponding to a subset of antennas of a group, to generate a plurality of signal groups. The plurality of signals associated with each group is at least one of the data signals and the SRS. In an embodiment, the grouping operation performed in the RU and the DU is same.

The DU 1010 performs a second stage filtering on the one or more group specific filtered signals associated with a plurality of the signal groups, received from the RU 1008, to obtain one or more second stage filtered signals. In an embodiment, the DU 1010 receives baseband I/Q samples of the group specific signals are compressed using an I/Q compressor. The DU 1010 performs I/Q decompression and retrieval of I/Q samples of the group specific filtered signals. Also, the DU 1010 applies a detection method to process the group specific filtered signals. The detection methods may be one of linear and non-linear equalizers.

The second stage filtering is performed by one or more second stage filters, wherein each of the one or more second stage filters and each of the one or more second stage filtered signals are associated with a user and a layer. Each of the one or more second stage filters or each second stage filter is one of a second stage matched filter, a second stage MMSE filter, and a second stage MMSE-IRC filter.

Also, each of the one or more second stage filters are associated with at least one of an estimated second stage CSI associated and a measured second stage interference covariance. The estimated second stage CSI and the measured second stage interference covariance are obtained using the group specific filtered DMRS, in an embodiment. Also, the estimated second stage CSI is obtained from one or more group specific filtered CSI, the measured second stage interference covariance is obtained from one or more group specific filtered interference plus noise signals, in an embodiment.

FIG. 11 shows an illustration of an Antenna Array Structure, in accordance with an embodiment of the present disclosure.

In Antenna Array Structures, antenna array has a substantial role to play in receiver beamforming. An antenna array can be modeled as (M, N, P, K, L, dz, dy), where M is number antenna elements in vertical,
N is number of antenna elements in horizontal,
P is number of polarizations to support Co-Pol and X-Pol,
K is number of antenna elements with same input feed in vertical,
L is number of antenna elements with same input feed in horizontal,
dz is spacing between antenna elements in vertical, dy is spacing between antenna elements in horizontal.

Total number of antenna elements are M×N×P. Mapping antenna elements to same input feed can be done in several ways.

As shown in FIG. 11, considering an example of 128 antenna elements with 64 antenna feeds. The antenna array can be represented as [8, 8, 2, 2, 1, 0.5λ, 0.5λ], that is, 8 antenna elements in vertical, 8 in horizontal each with cross polarization, and 128 antenna elements are used. In addition to that, 2 antenna elements are given the same feed in vertical and no mapping of multiple antenna elements to the same feed in horizontal. Eventually there are 64 antenna feeds with 128 antenna elements.

In an example embodiment, condensing is performed at the RU and equalizing is performed at the DU. This is performed by assuming 64 outputs from an antenna array with 8 elements in vertical and 4 elements in horizontal each with cross polarization. 8 outputs of each column of an antenna array is formed as a group. That is, 8 outputs corresponding to co-polarization are formed into one group and 8 outputs corresponding to cross polarization are formed into another group. In similar fashion, 8 groups are formed out of which 4 corresponds to co-polarization and another 4 corresponds to cross-polarization. That is, 8 stream output from the RU fed to the DU and the DU equalizes 8 streams and gives out one equalized data which will be further processed to decode data. The same can be extended to any antenna configuration M, N, P of the antenna array, and the size of the first group can be chosen from these.

FIG. 12A shows a flow chart illustrating how two-stage receiver condenses and equalizes received signal using occupied RS and null subcarriers when port signaling is enabled FIG. 12A shows a flowchart illustrating port signaling with two-stage filtering at BS receiver. FIG. 12A delineates how two-stage receiver does channel state information (CSI) and interference plus noise (I+N) covariance estimation, and equalization when port signaling is enabled, in accordance with an embodiment of the present disclosure. As shown in FIG. 12A, first stage filtering at RU estimates CSI using occupied RS subcarriers and measures I+N covariance using both occupied RS subcarriers and null subcarriers. First stage filtering coefficients are determined using the estimated CSI and measured I+N covariance. First stage filtering outputs group specific filtered signals.

As shows in FIG. 12A, either group specific filtered RS along with group specific filtered null subcarriers or group specific filtered CSI along with group specific filtered I+N samples are passed to DU to estimate CSI and I+N covariance. Second stage filtering coefficients are determined using the estimated CSI and measured I+N covariance. Second stage filtering outputs equalized data FIG. 12B shows a block diagram representation of performing condensing at the RU and the equalizing at the DU, in accordance with an embodiment of the present disclosure.

As shown in FIG. 12B, first stage filtering is performed in the RU and the second stage filtering is performed in the DU. First stage filtering at the RU helps in condensing or reducing the received signals on all antennas to a comparatively lesser number of streams and helps in reducing the computational complexity for equalizing the streams at the DU.

Also, the FIG. 12B assumes a single layer SU-MIMO. The first stage filtering is one of DFT weight combining, Matched Filter (MF), Maximal Ratio Combining (MRC), Minimum Mean Square Error (MMSE) equalization, Interference Rejection Combining (IRC), and Minimum Mean Square Error-Interference Rejection Combining (MMSE-IRC), etc. The DFT weight combining is a method that does not require knowledge of Channel State Information (CSI) and noise and interference covariance matrix (NICM) associated with the group signal. In this method, same weights are applied on all columns of an antenna array with specified or pre-determined elevation angle. For the remaining methods, filter coefficients are generated based on one of the estimated channel state information and measured covariance matrix associated with the group specific signals.

For example, as shown in FIG. 12B grouping is performed by assuming 64 antenna outputs and 8 outputs of each column is considered as a group. So, there are 8 groups in total. The grouping means the antenna elements in the group will be processed together. As shown in the FIG. 12B, first stage filtering at the RU provides one stream output per group and said streams are passed to the DU for equalization. For single layer SU-MIMO, equalization at the DU provides one equalized output.

FIG. 13 shows a block diagram of RU-DU split in two-stage filtering when group specific filtered occupied DMRS subcarriers and group specific filtered null subcarriers are passed from RU to DU for CSI and interference plus noise covariance estimation at DU and group specific filtered data is passed from RU to DU for equalization at DU, in accordance with an embodiment of the present disclosure.

As shown in the FIG. 13, the RU performs first stage group specific filtering based on CSI and NICM. The DU performs a second stage filtering on the group specific filtered data using group specific filtered DMRS.

The first stage group specific filtering at RU is performed as follows:

Let Y is the received signal on all the antennas which will be of the form $Y=HX+I+N_0$ is of the size $1 \times MNP$ where, H is the channel of size MNP×1 assuming one layer transmission from the user X is one of data and reference signals of size 1×1, I is the inter-cell interference of size MNP×1, and $N_0$ is the background noise is of size MNP×1

All the variables are shown for a given sub-carrier in a given OFDM symbol. Considering one column of an antenna array, Let $Y_i=[Y_{i1}\ Y_{i2}\ \ldots\ Y_{iM}]^T$ is the received vector on $i^{th}$ column of an antenna array that comprises of the signals that belong to that column, $H_i=[H_{i1}\ H_{i2}\ \ldots\ H_{iM}]^T$ is the corresponding estimated channel of size M×1, $N_0$ is the measured variance of interference+noise on a column i; and $R_{io}=(Y_{ic}-H_iX)(Y_{ic}-H_iX)'$ is the measured covariance of interference+noise using occupied DMRS subcarriers on a column i of size M×M $R_{in}$ is the measured covariance of interference+noise using null subcarriers on a column i of size M×M $R_i$ is the mean of intereferece+noise covariance measured using occupied DMRS subcarriers and null subcarriers on a column i of size M×M Filter coefficients for some of the methods except DFT combining are calculated as follows:

First stage MF filter coefficients $W_i=H'_i$

First stage MRC filter coefficients $W_i=H'_i(\text{diag}(Ri))^{-1}$

First stage MMSE filter coefficients $W_i=(H'_iH_i+N_0I)^{-1}H'_i$

First stage IRC-MRC filter coefficients $W_i=H'_iR_i^{-1}$

First stage IRC-MMSE filter coefficients $W_i=(H'_iR_i^{-1}H_i+I)^{-1}H'_iR_i^{-1}$ $W_i=[W_{i1} \; W_{i2} \ldots W_{iM}]$ are the first stage filter coefficients corresponds to column i of an antenna array and is of size 1×M. Here $H'_i$ is the conjugate transpose of $H_i$ and ' is used to represent conjugate transpose from now on.

The DU receives the group specific filtered data $Z_i$, group specific filtered occupied DMRS subcarriers, and group specific filtered null subcarriers from the RU. The DU estimates CSI using group specific filtered occupied DMRS subcarriers and measures NICM using both group specific filtered occupied DMRS subcarriers and group specific filtered null subcarriers. The DU generates the filter coefficients using the estimated CSI and the measured NICM. The filtered coefficients are applied on the received group specific filtered data to perform a second stage filtering and generate equalized data.

FIG. 14 shows a block diagram of RU-DU split in two-stage filtering when group specific filtered CSI estimated using occupied DMRS subcarriers, group specific filtered interference plus noise (I+N) samples measured using both occupied DMRS subcarriers and null subcarriers are passed from RU to DU to measure interference plus noise covariance and group specific filtered data is passed from RU to DU for equalization at DU, in accordance with an embodiment of the present disclosure.

As shown in FIG. 14, the RU generates group specific filtered CSI and group specific filtered interference samples from the received signal. Also, the RU estimates CSI and measure NICM. The RU transmits group specific filtered specific CSI, group specific filtered I+N samples and the group specific filtered data to the DU. The DU measures the NICM using the filtered I+N samples. The DU generates the filter coefficients using the filtered CSI and the measured NICM. The filtered coefficients are applied on the received group specific filtered data to perform a second stage filtering and generate equalized data.

FIG. 15A shows an illustration of first stage filtering at the RU when group specific filtered occupied DMRS subcarriers, group specific filtered null subcarriers, and group specific filtered data are outputs of RU, in accordance with an embodiment of the present disclosure.

The first stage filtering at the RU comprises grouping of received signals, generating and applying filter coefficients specific to a group. A group here refers to a group of antenna elements in the antenna array. The grouping can be done in many ways, such as, but not limited to:

All vertical elements are grouped together.

All polarization elements are grouped together.

A number is indicated by the DU to the RU for grouping purposes and then, the RU groups those antenna elements, as an example the grouping may be one of 8, 16 and 32.

The RU indicates its capability first to DU and then the DU may inform the RU accordingly about the grouping factor to be used. The grouping factor or dimensions i.e., horizontal or vertical or any other dimension can be signaled as well by the DU. In an embodiment, the grouping is independently performed by the RU without the involvement of the DU.

The total streams from the RU to the DU are number of Elements/number of groups. This limitation may be indicated from the DU to the RU and the RU may decide by itself the grouping phenomenon.

For example, grouping is performed by assuming 64 antenna outputs and 8 outputs of each column is considered as a group. So, there are 8 groups in total. The grouping means the antenna elements in the group will be processed together. The number of antenna elements to group determines the interference cancellation using the filters and how the filter may be designed. The filter is designed based on the information relevant to the group such as channel state information of the grouped signals, signals received on the group such as data signals, reference signals, null tones received on the antennas of the group i.e. null tones are tones without any data or reference signal transmission, which can be used for noise and interference estimation. The reference signals can be at least one of SRS, DMRS and the like. The data signals correspond to one of PRACH, PUCCH, PUSCH data and the like.

In an embodiment, assuming a group size of 8 as an example, grouping is performed in such a way that each column in an antenna array is a group. The rationale for considering the antenna elements of a given polarization of a vertical column into one group is as follows: The channel state associated with the signals that infringe on the vertical elements of a vertical column tend to be highly correlated. The relation between the channel states of these signals depend mainly on the antennas spacing, DOA of the signal of interest and the DOA of any co-channel interference signal. The aim of the two-stage receiver in such a scenario is as follows:

The first stage filtering applies a group/column specific filter on each column to obtain a group/column specific output that is a single output. That is the group/column specific filter weights and combines the signal that belong to a specific group/column to obtain a single output. The weights are selected with an aim to maximize the signal quality or reduce interference etc.

The filtering is applied on the data, occupied DMRS subcarriers, and the null subcarriers that belong to each group/column. After obtaining the group/column specific filter to all the available groups/columns present, there are a number of outputs equal to L (e.g., L=8).

FIG. 15B shows an illustration of first stage filtering at the RU when group specific filtered CSI, group specific filtered I+N samples, and group specific filtered data are outputs of RU, in accordance with an embodiment of the present disclosure.

The second stage filtering is performed at the DU on the filtered data received from the RU. DU uses at least one of group specific filtered occupied DMRS subcarriers, group specific filtered null subcarriers, group specific filtered CSI, and group specific filtered I+N samples passed from RU to estimate CSI and NICM and use them are used for generating second-stage filter coefficients. The second stage filter is configured to combine the RU outputs in such way that the signal energy is maximized and residual noise-plus-interference that is left after RU filtering is minimized. Typical filtering solutions are one of MF, MRC, MMSE equalization, IRC followed by MRC, and IRC followed by MMSE. The second stage filter equalizes the filtered data signals passed from RU and this equalized data is further processed to decode the data. Following explanation assumes group specific filtered CSI and group specific filtered I+N samples are passed from RU to DU Filter coefficients at the DU 1110 are generated similar to how it is done at RU. Let G of size 1×NP, is filtered CSI, that is $G=[\hat{H}_1 \; \hat{H}_2 \ldots \hat{H}_{NP}]^T$, where $\hat{H}_i=W_{i1}H_{i1}+W_{i2}H_{i2}+ \ldots +W_{iM}H_{iM}$, is the group specific filtered CSI of group i and $\hat{R}_I$ of size NP×NP, is the measured covariance using group specific filtered I+N samples, that takes an explicit form for example $\hat{R}_I=\hat{I}\hat{I}'$, $\hat{I}=[I_1 \; I_2 \ldots I_{NP}]^T$ and $I_i$ will be of the form $W_i(Y_i-H_iX)$ Filter coefficients are calculated as follows,
Second stage MF filter coefficients $\hat{W}=G'$
Second stage MRC filter coefficients $\hat{W}=G'(\text{diag}(\hat{R}_I))^{-1}$
Second stage MMSE filter coefficients $\hat{W}=(G'G+\text{trace}(\hat{R}_I)/\text{size}(\hat{R}_I)I)^{-1}G'$
Second stage IRC-MRC filter coefficients $\hat{W}=G'\hat{R}_I^{-1}$
Second stage IRC-MMSE filter coefficients $\hat{W}=(G'\hat{R}_I^{-1}G+I)^{-1}G'\hat{R}_I^{-1}$
$\hat{W}$ are the second stage filter coefficients and these filter coefficients are applied on filtered data signal to equalize the data $$\hat{Z}=\hat{W}\times Z$$

The post processing SINR on each subcarrier is equal to $G'\hat{R}_I^{-1}G$. Z is suitably scaled before LLRs are passed to the decoder. Equalized data is further processed to decode the data.

In an embodiment, there are three methods to estimate interference plus noise covariance at the DU. First method is using group specific filtered I+N samples passed from the RU to the DU, the second method is using group specific filtered occupied DMRS subcarriers and group specific filtered null subcarriers passed from the RU to the DU, and the third method is using group specific filtered CSI, group specific filtered occupied DMRS subcarriers, and group specific filtered null subcarriers passed from RU to DU.

In the first method, group specific filtered I+N samples $I_i$ of a group i are passed from RU to DU. Similarly, group specific filtered I+N samples are passed from RU to DU from all the groups. These group specific filtered I+N samples from all groups are accumulated at DU and used to measure interference plus noise covariance as follows $$\hat{I}=[I_1\ I_2\ \ldots\ I_{NP}]^T \text{ where}$$

$I_i=W_i(Y_i-H_iX)$ are the group specific filtered interference samples of group i passed from RU to DU
Interference plus noise covariance is $\hat{I}\hat{I}'$ In the second method, group specific filtered occupied DMRS subcarriers and group specific filtered null subcarriers are passed from RU to DU. Similarly, group specific filtered occupied DMRS subcarriers and group specific filtered null subcarriers are passed from RU to DU from all the groups. These group specific filtered occupied DMRS subcarriers and group specific filtered null subcarriers from all groups are accumulated at DU and used to estimate CSI and measure interference plus noise covariance as follows $\hat{I}_o=\hat{Y}-\hat{H}X$ is I+N measured using group specific filtered occupied DMRS,
$\hat{I}_n$ is I+N measured using group specific filtered null subcarriers,
$\hat{Y}=[\hat{Y}_1\ \hat{Y}_2\ \ldots\ \hat{Y}_{NP}]^T$ is the accumulated filtered occupied DMRS subcarriers passed from RU to DU,
$\hat{H}$ is the estimated CSI at DU.
Interference plus noise covariance is mean of $\hat{I}_o\hat{I}_o'$ and $\hat{I}_n\hat{I}_n'$ on both group specific filtered occupied DMRS subcarriers and group specific filtered null subcarriers respectively In the third method, group specific filtered CSI, group specific filtered occupied DMRS subcarriers, and group specific filtered null subcarriers are passed from RU to DU. Similarly, group specific filtered CSI, group specific filtered occupied DMRS subcarriers, and group specific filtered null subcarriers are passed from RU to DU from all the groups. These group specific filtered CSI, group specific filtered occupied DMRS subcarriers, and group specific filtered null subcarriers from all groups are accumulated at DU and used to measure interference plus noise covariance as follows $\hat{I}_o=\hat{Y}-\hat{H}X$ is I+N measured using group specific filtered occupied DMRS,
$\hat{I}_n$ is I+N measured using group specific filtered null subcarriers,
$\hat{Y}=[\hat{Y}_1\ \hat{Y}_2\ \ldots\ \hat{Y}_{NP}]^T$ is the accumulated filtered DMRS passed from RU to DU,
$\hat{H}$ is the filtered estimated CSI passed from RU to DU.
Interference plus noise covariance is mean of $\hat{I}_o\hat{I}_o'$ and $\hat{I}_n\hat{I}_n'$ on both group specific filtered occupied DMRS subcarriers and group specific filtered null subcarriers respectively FIG. 16A shows a block diagram representation of an interference plus noise covariance estimation at the DU using group specific filtered occupied DMRS subcarriers and group specific filtered null subcarriers, in accordance with an embodiment of the present disclosure.

FIG. 16B shows a block diagram representation of an interference plus noise covariance estimation at the DU using group specific filtered I+N samples, in accordance with an embodiment of the present disclosure.

One embodiment of the present disclosure is estimation of CSI and interference plus noise covariance $R_i$ for a group. A group specific signals consist of data and one or more DMRS. The operations w.r.t channel estimation and estimation of $R_i$ for a given group are as follows:

Estimate and correct the timing and frequency offsets on one or more DMRS symbols that are present in the group
Obtained estimated CSI after interpolation in time and frequency
Collect noise-plus-interference samples by subtracting the regenerated reference signal that is obtained based on estimated CSI and the reference symbol sequence and measuring I+N on null subcarriers. Obtain an estimate of the group specific $R_i$ by averaging the per subcarrier $R_i$ estimates over all the available subcarriers in a PRB or PRG of a time slot (i.e., the minimum allocated resource over which both data and reference symbols experience same interference signals) of all available DMRS symbols.
Obtain the group specific filter coefficients based on the estimated CSI and estimated $R_i$
Filter the data and RS of the group using the group specific filter
The filter coefficients are applied on received signal on each column from i=1 to NP as shown below:

$$Z_i=W_i\times Y_i$$

$$Z_i=W_{i1}Y_{i1}+W_{i2}Y_{i2}+\ldots+W_{iM}Y_{iM}$$

Similarly, the group specific filter coefficients are applied on each column and filtered data signal output will be of the form $Z=[Z_1\ Z_2\ \ldots\ Z_{NP}]^T$ is of size 1×NP. Similar operation is carried out on the RS as well. The filtered data and RS associated with all the groups are communicated to the DU through I/Q compression at DU, transmission as per ORAN specification over a wired medium and collection at the DU, processing that includes I/Q decompression followed by DU filtering for the specific physical channel of interest.

FIG. 17 shows an illustration of two-stage filtering using DMRS based weights to perform first-stage filtering at RU and second-stage filtering at DU, in accordance with an embodiment of the present disclosure.

As shown in FIG. 17, the two-stage filtering is performed using DMRS based weights at RU to perform first-stage filtering and DMRS based weights at DU to perform second-stage filtering. The RU estimates channel using FFT outputs of received DMRS and measures covariance using FFT outputs of received DMRS and FFT outputs of received null subcarriers. Then, the RU determines filter weights to perform first-stage filtering. After first-stage filtering at the RU, the DU uses at least one of group specific filtered occupied DMRS subcarriers, group specific filtered null subcarriers, group specific filtered CSI, and group specific filtered I+N samples passed from RU to determine filter coefficients for second-stage filtering.

One embodiment of the present disclosure are filtering methods for Multilayer transmission of Single User-Multiple Input Multiple Output (SU-MIMO) and Multiple Users-Multiple Input Multiple Output (MU-MIMO). When multiplexing is introduced such as SU-MIMO with more than one-layer transmission, or in MU-MIMO where multiple users are multiplexed on same time frequency resources, filtering needs to consider user and layer specific filtering as well. That is, in first stage filtering, group specific filtering needs to take into account the number of layers transmitted in uplink and second stage filtering needs to equalize data signals from all the layers.

One embodiment of the present disclosure is SU-MIMO filtering. Considering a 2-layer transmission and filtering technique:

$$Y_i = H_i X + N_i$$

where $$H_i X = H_{1i} X_1 + H_{2i} X_2$$

where, i=1 to NP for all columns (where column includes polarization as well)

$Y_i$ is the received signal on a column i of size M×1, and $H_i$ is the estimated channel for both layers on a column i of size M×2

In SU-MIMO with more than one-layer transmission, the first stage filtering can be performed using two methods. The first method is a Multi-layer filtering method-1. In the first method, filter coefficients are generated specific to the detection of each layer in a group and inter-layer interference is accounted for in the covariance estimation associated with that layer. That is, for two layers, two set of filter coefficients are generated as follows:

$$W_{1i} = H'_{1i} R_{1i}^{-1}$$

where, $W_{1i}$ are the first stage filter coefficients corresponding to layer-1 to apply on column i of an antenna array.

$H_{1i}$ is the channel corresponding to layer-1 on a column i.

$R_{1i}$ is the measured interference plus noise covariance matrix corresponding to layer-1 on a column i, that is $R_{1i} = H_{2i} H'_{2i} + R_{nn}$ and $R_{nn}$ is the measured covariance of inter-cell interference and noise.

Similarly, for layer-2

$$W_{2i} = H'_{2i} R_{2i}^{-1}$$

where, $W_{2i}$ are the first stage filter coefficients corresponding to layer-2 to apply on column i of an antenna array.

$H_{2i}$ is the channel corresponding to layer-2 on a column i of an antenna array.

$R_{2i}$ is the measured interference plus noise covariance matrix corresponding to layer-2, that is $R_{2i} = H_{1i} H'_{1i} + R_{nn}$.

After applying filter weights, $$Z_{1i} = W_{1i} \times Y_i$$

$$Z_{2i} = W_{2i} \times Y_i$$

$$Z_{1i} = H'_{1i} R_{1i}^{-1} H_{1i} X_1 + H'_{1i} R_{1i}^{-1} H_{2i} X_2 + H'_{1i} R_{1i}^{-1} N_i = G_{1,1,i} X_1 + G_{1,2,i} X_2 + N_{1i}$$

$$Z_{2i} = H'_{2i} R_{2i}^{-1} H_{1i} X_1 + H'_{2i} R_{2i}^{-1} H_{2i} X_2 + H'_{2i} R_{2i}^{-1} N_i = G_{2,1,i} X_1 + G_{2,2,i} X_2 + N_{2i}$$

where, $Z_{1i}$ is the filtered data corresponding to layer-1 on column i, and $Z_{2i}$ is the filtered data corresponding to layer-2 on column i.

The above procedure is repeated for all columns;

At the end, first stage filtering gives filtered channel estimates $G_{1,1} = [G_{1,1,1} \; G_{1,1,2} \; \ldots \; G_{1,1,NP}]^T$, $G_{1,2} = [G_{1,2,1} \; G_{1,2,2} \; \ldots \; G_{1,2,NP}]^T$, and filtered data $Z_1 = [Z_{1,1} \; Z_{1,2} \; \ldots \; Z_{1,NP}]^T$ for layer-1, filtered channel estimates $G_{2,1} = [G_{2,1,1} \; G_{2,1,2} \; \ldots \; G_{2,1,NP}]^T$, $G_{2,2} = [G_{2,2,1} \; G_{2,2,2} \; \ldots \; G_{2,2,NP}]^T$, and filtered data $Z_2 = [Z_{21} \; Z_{22} \; \ldots \; Z_{2NP}]^T$ for layer-2 as outputs. The first stage not only passes the group specific filtered data signals but also applies the aforementioned operations on the reference signals and communicates at least one of the group specific filtered occupied DMRS subcarriers, group specific filtered null subcarriers, group specific filtered CSI, and group specific filtered I+N samples to the second stage.

The above filtering is performed by considering that:

For each group, the operations such as time-frequency correction and channel interpolation are carried out for each layer and the compensation of time and frequency errors are carried out before proceeding with group specific filtering.

Further, a layer specific channel estimation is carried out on the DMRS of each layer and also the background NICM is estimated based on the occupied DMRS subcarriers and null subcarriers of both layers.

In the case of a single layer, the group specific filter applies on the occupied DMRS subcarriers and null subcarriers and the filtered occupied DMRS subcarriers and filtered null subcarriers are passed to the second stage. However, for the two-layer scenario, there are 4-filters applied on the occupied DMRS subcarriers and null subcarriers associated with the two layers. Specifically, the channel state information associated with $Z_{1i}$ i.e., the filtered data corresponding to layer-1 on column i, and $Z_{1,2,i}$ i.e, the filtered data corresponding to layer-2 on column i are as follows: $G_{1,1,i} P_1$, $G_{1,2,i} P_2$, $G_{2,1,i} P_1$, $G_{2,2,i} P_2$ where $P_1$ is the received RS associated with the first layer and $P_2$ is the received RS associated with the second layer. So it can be observed that with 2-layer SU-MIMO, filtered CSI of size 2×2 is obtained from each group opposed to 1 filtered CSI in single layer SU-MIMO. That is, number of filtered CSI increases with order $O(n^n)$, where n is the number of layers. In case of 5G NR, for 2-layers, the DMRS are frequency multiplexed into even and odd subcarrier locations. Therefore, the RS of even subcarriers are filtered as: $G_{1,1,i} P_1$, $G_{2,1,i} P_1$ and RS of odd subcarriers are filtered as: $G_{1,2,i} P_2$, $G_{2,2,i} P_2$ respectively.

This method generalizes to a 4-layers scenario where one first collects the occupied DMRS subcarriers and null subcarriers of individual 4-layers followed by group specific processing steps.

As for occupied DMRS subcarriers and null subcarriers communicated to the DU is concerned, the number of reference signals are double the size compared to single layer scenario. This calls for a modification to the ORAN specifications to support such specialized RU group specific filtering.

In second stage filtering, filter coefficients to equalize the data signals of layer-1 are generated as follows $$\hat{W}_1 = G'_{1,1} \hat{R}_{1l}^{-1}$$

where $$\hat{R}_{1l} = \hat{I}_1^o \hat{I}_1^{o} + \hat{I}_1^n \hat{I}_1^{n} + G_{1,2} G'_{1,2}$$

Where $\hat{I}_1^o = [I_{11}^o \ I_{12}^o \ \ldots \ I_{1NP}^o]^T$ are the I+N samples measured on filtered occupied DMRS subcarriers and $I_{1i}^o$ will be of the form $W_{1i}(Y_i - H_{1i} X_1 - H_{2i} X_2)$,
$\hat{I}_1^n = [I_{11}^n \ I_{12}^n \ \ldots \ I_{1NP}^n]^T$ are the I+N samples measured on filtered null subcarriers.

Similarly, for layer-2, filter coefficients are generated as follows:

$$\hat{W}_2 = G'_{2,2} \hat{R}_{2l}^{-1}$$

where $$\hat{R}_{2l} = \hat{I}_2^o \hat{I}_2^{o} + \hat{I}_2^n \hat{I}_2^{n} + G_{2,1} G'_{2,1}$$

Where $\hat{I}_2^o = [I_{21}^o \ I_{22}^o \ \ldots \ I_{2NP}^o]^T$ are the I+N samples measured on filtered occupied DMRS subcarriers and $I_{2i}^o$ will be of the form $W_{2i}(Y_i - H_{1i} X_1 - H_{2i} X_2)$,
$\hat{I}_2^n = [I_{21}^n \ I_{22}^n \ \ldots \ I_{2NP}^n]^T$ are the I+N samples measured on filtered null subcarriers.

Equalized data on layer-1 $\hat{Z}_1 = \hat{W}_1 \times Z_1$ and on layer-2 $\hat{Z}_2 = \hat{W}_2 \times Z_2$. Equalized data is further processed to decode the data. Note that the DU utilizes at least one of the group specific filtered occupied DMRS subcarriers, group specific filtered null subcarriers, group specific filtered CSI, and group specific filtered I+N samples transmitted by the RU (or the first stage) for estimation of DU perceived CSI and residual NICM.

In Multi-layer filtering method-2, a sub-optimal alternative that uses with one filter/group for all layers. In this method, grouping of all column antennas of a given polarization is considered first. There are 4 columns for co-pol denoted as: [a, b, c, d] and another 4 for cross-pol denoted as: [e, f, g, h] (this can be generalized to other antenna panel configurations as well). The group specific filer for group {a} will be one that matches to the first layer and strives to eliminate interference caused by the second layer:

$$W_{11} = H'_{11} R_{11}^{-1}$$

For group {b}, a filter is applied that matches to the second layer and strives to eliminate interference caused by the first layer:

$$W_{22} = H'_{22} R_{22}^{-1}$$

Likewise, {c} uses a filter matched to the first layer and {d} uses one that is matched to the second layer. The same approach is followed for the cross-pol groups where a matched filter matched with any one layer is applied, but alternates between adjacent columns. This approach has the benefit that, it can retain compliance to ORAN since the number of filtered signals per group does not increase with the number of layers. There will be some performance penalty but it is expected to be reasonably small for SU MIMO, since the channel vectors associated with the layers generally tend to linearly dependent and separation of self-interference between the layers using column specific filtering of a given polarization is not an effective strategy in the first place.

Also, the method generalizes to 4-layers as well. In that case, 4-different matched filters each matched to one of the 4-layers are applied on the groups [a, b, c, d]. Likewise, applying the same strategy on the groups [e, f, g, h].

For 1-layer case, filter either even or odd DMRS depending on the DMRS port assigned to the layer For >1-layer case, apply the same filter to even and odd DMRS, and send these filtered DMRS as if they are the original DMRS IQ samples to the DU.

FIG. 18 shows an illustration of grouping in SU-MIMO with 2 layers aligned with Multi-layer filtering method-2 in accordance with an embodiment of the present disclosure. As shown in FIG. 18, considering 8×4×2 antenna array that is 64 receive antennas system. Each column with 8 vertical elements is a group and in total there are 8 groups, 4 corresponding to co-polarization and another 4 corresponding to cross-polarization. Figure below explains about grouping of SU-MIMO with 2 layers. The 2 layers are alternatively assigned to 8 groups. For example, consider the groups as {a, b, c, d, e, f, g, h}, such that the groups {a, c, e, g} are assigned to layer-1 and {b, d, f, h} are assigned to layer-2.

FIG. 19 shows an illustration of grouping in SU-MIMO with 4 layers aligned with Multi-layer filtering method-2, in accordance with an embodiment of the present disclosure. As shown in FIG. 19, considering 8×4×2 antenna array that is 64 receive antennas. Each column with 8 vertical elements is a group and in total there are 8 groups, 4 corresponding to co-polarization and another 4 corresponding to cross-polarization. As shown in FIG. 19, the grouping of SU-MIMO with 4 layers is performed i.e. 4 layers are alternatively assigned to 8 groups. For example, consider 8 groups as {a, b, c, d, e, f, g, h}, {a, e} groups are assigned to layer-1, groups {b, f} are assigned to layer-2, groups {c, g} are assigned to layer-3, and {d, h} are assigned to layer-4

For Multi-user MIMO, where multiple users are multiplexed on same time frequency resources. So, MU-MIMO more often handles more than 2 layers. So two-stage filtering of MU-MIMO can be seen as an extension of SU-MIMO with two-layer transmission explained in Multi-layer filtering method-1. Two-stage filtering explained below assumes IRC followed by MRC at both RU and DU.

Let L is the number of layers that are multiplexed for MU-MIMO, two-stage filtering should mitigate the inter-layer interference from L−1 layers along with inter-cell interference and background noise. Let $Y_i$ is the received vector on a column i and it will be of the form:

$$Y_i = \sum_{j=1}^{L} H_{j,i} X_j + I_i + N_i$$

where,
i is from 1 to NP
$H_{j,i}$ is the estimated channel corresponds to $j^{th}$ layer on column i
$X_j$ is the data corresponds to layer j
$I_i + N_i$ is the inter-cell interference and background noise on column i Filter coefficients corresponds to layer j are calculated as follows $$W_{ji} = H'_{ji} R_{ji}^{-1}$$

where $R_{ji} = \Sigma_{k=1, k \neq j}^{L} H_{ki} H'_{ki} + R_{nn}$ and $R_{nn}$ is the covariance of inter-cell interference and background noise. Similarly, filter coefficients are generated for all layers. After applying weights, filtered data signal of layer j will be of the form:

$$Z_{ji} = W_{ji} \times Y_i$$

and this repeats for all the layers and finally first stage filtering gives filtered data signals as outputs.

At the end, first stage filtering gives filtered channel estimates $G_{j,j}=[G_{j,j,1}\ G_{j,j,2}\ \ldots\ G_{j,j,NP}]^T$, $G_{j,k}=[G_{j,k,1}\ G_{j,k,2}\ \ldots\ G_{j,k,NP}]^T$ for k=1 to L and k≠j, and filtered data signals $Z_j=[Z_{j1}\ Z_{j2}\ \ldots\ Z_{jNP}]^T$ for layer-j as outputs. Similarly, first stage filtering produces outputs for all layers on each group.

Second stage filtering uses filtered CSI and filtered I+N samples from first stage and generates filter coefficients as follows:

$$\hat{W}_j = G'_{j,j} \hat{R}_j^{-1}$$

where $$\hat{R}_j = \hat{I}_j^o \hat{I}_j^{o'} + \hat{I}_j^n \hat{I}_j^{n'} + \sum_{k=1, k\neq j}^{L} G_{j,k} G'_{j,k}$$

Where
$\hat{I}_j^o = [I_{j1}^o\ I_{j2}^o\ \ldots\ I_{jNP}^o]^T$ are the I+N samples measured on filtered occupied DMRS subcarriers and $I_{ji}^o$ will be of the form $W_{ji}(Y_i - \Sigma_{k=1,k\neq j}^L H_{j,k} X_k)$,
$\hat{I}_j^n = [I_{j1}^n\ I_{j2}^n\ \ldots\ I_{jNP}^n]^T$ are the I+N samples measured on filtered null subcarriers and this repeats for all layers and filter coefficients are generated for each layer.

Equalized data on layer-j is $\hat{Z}_j = \hat{W}_j \times Z_j$ and similar procedure repeats for all multiplexed layers. Equalized data is further processed to decode the data.

FIG. 20 shows an illustration of grouping in MU-MIMO with 2 users each with 2 layers aligned with Multi-layer filtering method-2, in accordance with an embodiment of the present disclosure. As shown in FIG. 20, considering 8×4×2 antenna array that is 64 receive antennas. Each column with 8 vertical elements is a group and in total there are 8 groups, 4 corresponding to co-polarization and another 4 corresponding to cross-polarization. 4 layers corresponding to 2 users are alternatively assigned to 8 groups. For example, consider 8 groups {a, b, c, d, e, f, g, h}, are groups, {a, e} are assigned to layer-1 of user-1, {b, f} are assigned to layer-2 of user-2, {c, g} are assigned to layer-1 of user-1, and {d, h} are assigned to layer-2 of user-2.

In an embodiment, the RU Filtering is performed using SRS based CSI, in which the DU provides weights to the RU. The method mentioned above use either independent signaling combining e.g., DFT based beamforming of group signals or user specific filtering based on instantaneous, or slot specific measurements such as CSI or NICM of the signals of the group. A method that uses a group specific filter that is user specific and uses non-slot specific CSI measurements that are valid for longer-term e.g., 20 ms or more. The SRS signals are used, which are collected at the DU for CSI estimation of the individual users or layers, then derive the group specific filters based on a number of criteria.

SRS-based DFT weights including user-specific down tilt. The DFT Weights of an $i^{th}$ column for M antennas are given by:

$$W_i = e^{-j\frac{2\pi}{\lambda}(m-1)dz\cos(\theta_{etilt}(i))}$$

where m=1 to M, and M is the number of elements in a column of an antenna array. Arranging the weights of m=1, ..., M into a row vector and a vector $W_i$ for the $i^{th}$ column and $\theta_{etilt}(i)$ is the tile that is applied on the "i" th group/column. Let us the inner product of Wi with the CSI of a layer as:

$$m(\theta_{etilt}(i)) = |W_i^T H_i|$$

The value of $W_i$ with specific downtilt that maximizes the metric can be applied as a user specific group filter. In principle the same set of $W_i$ can be applied over all the columns if there is a single dominant path. However, if there are significant multipath different vertical tile values one could potentially be applied for different columns. This method may result in a better performance when there is significant multi-path caused by the scattered located the base station. After group specific filtering, the second stage proceeds with conventional receivers.

One embodiment of the present disclosure is SRS based weights at the RU and DMRS based weights the DU. FIG. 21 shows an illustration of first-stage filtering at RU using SRS based weights. As illustrated in the FIG. 21, the DU estimates channel and measures covariance using FFT outputs of received SRS passed from RU. Then, DU determines set of values and pass them to RU to perform first-stage filtering. After first-stage filtering at the RU, the DU uses at least one of filtered occupied DMRS subcarriers, group specific filtered null subcarriers, filtered channel estimates, and filtered I+N samples passed from the RU to determine filter coefficients for second-stage filtering.

One embodiment of the present disclosure is delay in SRS based weights at the RU for first-stage filtering. FIG. 22 shows an illustration of delay introduced in the first-stage filtering when SRS based filter weights are used at the RU. Consider, $T_{CSI,SRS}$ is the time taken to compute FFT of received SRS samples at the RU and then passing the received SRS samples to the DU, and also for the DU to estimate channel and inter-layer interference plus noise covariance. Let $T_{filter,SRS}$ is the time taken for the DU to determine set of values using estimated channel and measured covariance, and then pass these set of values to the RU to perform first-stage filtering. Total delay is $T_{total,SRS}=T_{CSI,SRS}+T_{filter,SRS}$. This total delay will have significant impact in high Doppler scenarios. One embodiment of the present disclosure is SRS based weights at the RU and DMRS based weights the DU. FIG. 23 shows an illustration of two-stage filtering using SRS based weights at the RU to perform first-stage filtering and DMRS based weights at DU to perform second-stage filtering. As illustrated in the FIG. 23, the DU estimates channel and measures covariance using FFT outputs of received SRS passed from RU. Then, DU determines set of values and pass them to RU to perform first-stage filtering. After first-stage filtering at the RU, the DU uses at least one of filtered occupied DMRS subcarriers, group specific filtered null subcarriers, and filtered channel estimates, and filtered I+N samples passed from the RU to determine filter coefficients for second-stage filtering.

In an embodiment, if the DU performs the necessary steps of time/frequency correction, channel interpolation, then the signals received by the DU experience a different set of impairments than those received at the RU. For example:

a. The frequency selectivity of the CSI will be altered by the group specific filters of the RU. Therefore, the DU channel estimates have to take into account the type of filtering applied at the RU so that suitable DU channel estimation method can be applied.

b. The RU may have compensated for the timing and frequency errors at the group specific filtering stage. Therefore, DU either disables such compensations or applies a suitable method as appropriate. This is as shown in FIG. 24.

FIG. 24 shows a block diagram illustration of filtering using a split of the DU and the RU, in accordance with an embodiment of the present disclosure.

As shown in FIG. 24, the RU may need to communicate the type of group specific filtering applied to the DU. If RU is performing the estimation, then the RU can directly send the filtered occupied DMRS subcarriers, filtered null subcarriers, filtered data and filtered interference samples to the DU. Then, the DU may or may not do the channel estimation again on the samples received from RU. This may be associated with the necessary signaling between the DU and the RU. Else, the DU will receive IQ samples from the RU and then do estimation, time offset correction etc. as if fresh information is received from RU.

One embodiment of the present disclosure is user independent cell specific and group specific tilts. For users with high Doppler and for common channels, it is preferable to apply different values of user independent i.e. cell specific, downtilt values for each groups. These values can be obtained by collecting estimates of different downtilt values used by the active users and this information is collected by a scheduler or upper layers. Data analytics can be used to determine and then configure user independent i.e. cell specific, downtilt values for different groups or columns. Such methods can generate beamforming weights that adapt to changes in user movement within the cell or sector.

The group specific tilts and the weights that are computed using SRS are applicable in the downlink (DL) group specific beamforming as well. For common channel such as primary synchronization signal (PSS), secondary synchronization signal (SSS), physical broadcast channel (PBCH), physical downlink control channel (PDCCH) and even CSI-RS and for data transmission to uses with high mobility, group specific tilts and the weights can be applied.

In some embodiments, methods use the CSI and NICM of each group to obtain the group specific filter coefficients to maximize the signal level and/or reduce noise-plus-interference of the received signal in a specific slot.

Estimating SRS-CSI specific user weights: First the SRS channel estimates is obtained for the $i^{th}$ group and the channel estimates normalized with the norm of the vector channel, calculating $W_i=H'_i/\text{norm}(H_i)$. The weight can be applied as a user specific weight in a given PRB or PRG. There is a time lapse on the order of 20 ms between the calculation of SRS channel estimates and the group specific filtering operation. Assuming that $W_i$ captures the spatial characteristics of the group, it can be used as a matched filter for each PRB/PRG. Alternatively, a wideband user specific filter may also be applied where the per PRB/PRB filters are further averaged over allocated bandwidth.

In case of multiple layers SU MIMO or MU MIMO, the same set of weights may be applied to collect the signals that correspond to both layers or different weights could be applied per layer. In that case, the number of outputs per group will be increased by a factor equal to the number of layers. The DU would need to exchange the group specific filter values to the RU through ORAN messages. It is noted that PRB or PRG level indication and I/Q compression of the filter etc. need to be addressed.

Another embodiment of the present disclosure is SRS CSI based user weights, obtained from a code book. In this embodiment, a code book is stored that comprises group specific weights. Let the $j^{th}$ row vector in the $i^{th}$ group be denoted by $C_{i,j}$. Determine the $j^{th}$ entry in the $i^{th}$ code book that maximizes a metric: $|C_{i,j}H_i|$ as the group specific filter. The code book can be determined either as a set of DFT weights parameterized with a vertical tilt or a pre-determined code book. The DU and the RU exchanges the code book as a onetime exchange for different grouping configurations and the DU indicates the entry in the code book that needs to be applied for certain group specific filtering.

In case of multiple layers SU-MIMO or MU-MIMO one could apply the same set of weights to collect the signals that correspond to both layers or different weights could be applied per layer. In that case, the number of outputs per group will be increased by a factor equal to the number of layers.

Another embodiment is SRS based RU beamforming weight calculation for multiple layers (SU and MU MIMO). Here the principles of Multi-layer filtering method-1 and computing the group specific weights using the SRS channel estimates are applied. In the method as in case of the Multi-layer filtering method-1, filter coefficients are generated specific to the detection of each layer in a group and inter-layer interference is accounted for in the covariance estimation associated with that layer. That is, for two-layer example, considering two set of filter coefficients are generated as:

$$W_{1i}=H'_{1i}R_{1i}^{-1}$$

where, $W_{1i}$ are the first stage filter coefficients corresponding to layer-1 to apply on column i of an antenna array.

$H_{1i}$ is the channel corresponding to layer-1 on a column i.

$R_{1i}$ is the measured interference plus noise covariance matrix corresponding to layer-1 on a column i, that is $R_{1i}=H_{2i}H'_{2i}+R_{nn}$ and $R_{nn}$ is the measured covariance of inter-cell interference and noise. In the uplink, scheduling decisions change at the slot level. A user that acts as an interferer from a neighbour cell may not be the source of interference in the next slot. The source of interference in case of SRS are the users who are sounded in that SRS occasion in a neighbour cell whereas the actual source of interference for PUSCH may arise from a different set of users whose channel states will be substantially different. Therefore, the other-cell NICM i.e., $R_{nn}$ will have to be approximated as a scaled identity matrix i.e., $R_{nn}=sI$ where s is the scaling factor may be chosen based on certain criterion.

Similarly, for layer-2

$$W_{2,i}=H'_{2i}R_{2i}^{-1}$$

where, $W_{2,i}$ are the first stage filter coefficients corresponding to layer-2 to apply on column i of an antenna array.

$H_{2i}$ is the channel corresponding to layer-2 on a column i of an antenna array.

$R_{2i}$ is the measured interference plus noise covariance matrix corresponding to layer-2, that is $R_{2i}=H_{1i}H'_{1i}+sI$.

This method can be generalized to more than 2-layer scenario by accounting for the self-interference arising from other layers appropriately. In this scenario, the number of group specific filtered data streams increase by a factor equal to the number of layers. The RU will have to transmit these additional group specific filtered data streams along with the additional group specific filtered reference streams to the DU. Also, pre-whitening by inverting NICM on SRS can be disabled optionally if in case self-interference at the is not to be cancelled.

In another embodiment of the present disclosure, a sub-optimal SRS based alternative that uses with one filter/group for all layers. In this method, it is considered grouping of all column antennas of a given polarization. There are 4 columns for co-pol denoted as [a, b, c, d] and another 4 for cross-pol denoted as [e, f, g, h]. The group specific filer for group {a} will be one that matches to the first layer and strives to eliminate interference caused by the second layer:

$$W_{1,i} = H'_{1,i} R_{1,i}^{-1}$$

For group {b}, a is applied that matches to the second layer and strives to eliminate interference caused by the first layer:

$$W_{2,i} = H'_{2,i} R_{2,i}^{-1}$$

Likewise, {c} uses a filter matched to the first layer and {d} uses one that is matched to the second layer. The same approach is followed for the cross-pol groups where a matched filter matched with any one layer is applied, but alternates between adjacent columns. This method can be further generalized for more layers.

Common channels such as PRACH and PUCCH format-0 cannot employ user specific group filters. For common channels, one should apply user independent weights. They can be group specific weights i.e. each column can have different weights. Such an implementation allows group specific beams that are oriented in specific directions (in election or azimuth or a combination) and allows the base station to enhance the overall performance by tailoring the beams in the direction of user traffic.

However, if PRACH or PUCCH format-0 or any other control channel transmissions are associated with PUSCH transmission, then the same group specific filter that is applied for PUSCH can be applied for these channels.

(a) Common channel requires user independent weights; one possibility is as the follows:

(a.1) Apply different vertical tilts on each vertical column, then treat each tilt independently, then identify performance on each of them based on either SRS channel estimates. At one time, the gNB can apply 8 different tilts using 8 columns (4 H and 4 V) or N columns based on M, N, P configuration, or the gNB can use the same tilt on V and H of 1 column and combine them.

(a.2) This can be called a calibration phase. Feed this to the SON/protocol stack which can use RSRP measurements etc. to identify assuming traffic is there. This can be used for identifying the semi-static beamforming.

(a.3) This can be used on DL, based on DL measurements, such as the cell-splitting approach, the DFT weights identified may be used on horizontal or vertical.

FIG. 25 shows a flowchart illustrating a method for communication in a communication network, in accordance with some embodiments of the present disclosure.

As illustrated in FIG. 25, the method 2500 comprises one or more blocks for communication in a communication system. The communication network comprising a plurality of BSs spatially distributed in a geographic region, at least one UE being communicatively connected to a BS. The method 2500 may be described in the general context of computer executable instructions. Generally, computer executable instructions can include routines, programs, objects, components, data structures, procedures, modules, and functions, which perform functions or implement abstract data types.

The order in which the method 2500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 2510, signaling is performed by the BS 300 at least one of a demodulation reference signal (DMRS) configuration and a sounding reference signal (SRS) configuration to at least one UE. The DMRS configuration comprises signaling at least one antenna port number from a plurality of antenna port numbers. The at least one antenna port number indicates location of occupied subcarriers and null subcarriers associated with a DMRS transmission of the at least one UE. The location of occupied DMRS subcarriers and null subcarrier positions are associated with one of one OFDM symbol and one or more OFDM symbols. The SRS configuration comprises signaling of parameters associated with a time, a frequency and a code.

Each of the plurality of BSs signals at least one antenna port from a plurality of antenna port numbers to a connected UE, wherein the port number signaled by at least two BSs are distinct. Each of the plurality of BSs signals a SRS configuration using parameters associated with a time, a frequency and a code, wherein the SRS configuration signaled by at least two BSs are distinct.

At block 2520, receiving, by the receiver configured in the BS 300, at least one of a data and DMRS signals corresponding to the at least one UE, and SRS signals corresponding to the at least one UE. The data and said DMRS signals are being received on one or more receive antennas of the at least one BS. The SRS signals being received on one or more receive antennas of the at least one BS.

At block 2530, grouping is performed by the grouping unit configured in the BS 300, a subset of the plurality of signals corresponding to a subset of antennas to generate a plurality of signal groups. The signals associated with each of the plurality of signal groups is at least one of the data signals, and the DMRS signals. The grouping is performed by the at least one RU and the at least one DU. Also, the signals associated with each of the plurality of signal groups comprises at least one user, said at least one user has at least one layer.

At block 2540, a first stage filtering is performed, by the first stage filter configured in the BS 300, on the plurality of signals associated with each of the plurality of signal groups using one or more group specific filters to obtain one or more group specific filtered signals. The group specific filtered signals comprise at least one of one or more group specific filtered data signals, one or more group specific filtered DMRS, one or more group specific filtered channel state information (CSI), and one or more group specific filtered interference plus noise signals.

The group specific filters are determined using a set of parameters. The set of parameters are determined based on one of the DMRS signals and the SRS signals. The set of parameters determined based on DMRS signals include channel values and interference values measured from occupied and null subcarriers associated with the signaled at least one antenna port number. The set of parameters determined based on SRS signals include channel values associated with the SRS configuration.

At block 2550, a second stage filtering is performed, by the second stage filter configured in the BS 300, on the one or more group specific filtered signals associated with a plurality of the signal groups to obtain one or more second stage filtered signals. The second stage filtering is performed by one or more second stage filters, wherein each of the one or more second stage filters and each of the one or more second stage filtered signals are associated with a user and a layer. Each of the one or more second stage filters are associated with at least one of an estimated second stage CSI associated and a measured second stage interference covariance. Each of the one or more second stage filters are one of a second stage matched filter, a second stage MMSE filter, and a second stage MMSE-IRC filter.

Further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

We claim:

1. A method for communication in a communication network, said communication network comprising a plurality of base stations (BSs) spatially distributed in a geographic region and at least one user equipment (UE) being connected to each BS, of the plurality of BSs, the method comprising:

signaling, by a BS, at least one of a demodulation reference signal (DMRS) configuration and a sounding reference signal (SRS) configuration to at least one UE, wherein:

said DMRS configuration comprises signaling at least one antenna port number from a plurality of antenna port numbers, said at least one antenna port number indicates a location of occupied subcarriers and null subcarriers associated with a DMRS transmission of the at least one UE, and said SRS configuration comprises signaling of parameters associated with a time, a frequency and a code;

receiving, by the BS, at least one of: data and DMRS signals corresponding to the at least one UE, wherein said data and said DMRS signals are being received on one or more receive antennas of the at least one BS, and SRS signals corresponding to the at least one UE, wherein said SRS signals are being received on one or more receive antennas of the at least one BS;

grouping, by the BS, a subset of the plurality of signals corresponding to a subset of antennas, to generate a plurality of signal groups, wherein signals associated with each signal group of the plurality of signal groups, comprise at least one of the data signals and the DMRS signals;

performing a first stage filtering, by the BS, on the plurality of signals, associated with each signal group of the plurality of signal groups using one or more group specific filters to obtain one or more group specific filtered signals, wherein:

said group specific filters are determined using a set of parameters, said set of parameters is determined based on one of the DMRS signals and the SRS signals, the set of parameters determined based on DMRS signals, comprise channel values and interference values measured from occupied and null subcarriers associated with the signaled at least one antenna port number, and the set of parameters determined based on SRS signals, comprises channel values associated with the SRS configuration;

performing a second stage filtering, by the BS, on the one or more group specific filtered signals associated with a plurality of the signal groups to obtain one or more second stage filtered signals;

wherein the first stage filtering is performed by a radio unit (RU) and the second stage filtering is performed by a distributed unit (DU).

2. The method as claimed in claim 1, wherein each BS, of the plurality of BSs, signals at least one antenna port number, from a plurality of antenna port numbers, to a connected UE, wherein the port numbers signalled by at least two BSs are distinct.

3. The method as claimed in claim 1, wherein each BS, of the plurality of BSs, signals a SRS configuration using parameters associated with a time, a frequency and a code, wherein the SRS configuration signalled by at least two BSs are distinct.

4. The method as claimed in claim 1, wherein a location of occupied DMRS subcarriers and null subcarrier positions are associated with one of one or more OFDM symbols.

5. The method as claimed in claim 1, wherein the first stage filtering and the second stage filtering are is performed using a first stage filter and a second stage filter respectively, wherein said first stage filter and said second stage filter are co-located in a co-located unit.

6. The method as claimed in claim 1, wherein the set of parameters is determined by the co-located unit.

7. The method as claimed in claim 1, wherein the set of parameters determined based on DMRS signals comprise channel and interference values measured from occupied and null subcarriers associated with the signalled at least one antenna port number, and wherein said channel and interference values are determined by the co-located unit.

8. The method as claimed in claim 1, wherein the set of parameters, determined by the DU, are communicated to the RU using an interface.

9. The method as claimed in claim 1, wherein the channel values associated with the SRS configuration are channel values obtained by the DU.

10. The method as claimed in claim 1, wherein the group specific filtered signals comprise at least one of one or more group specific filtered data signals, one or more group specific filtered DMRS, one or more group specific filtered channel state information (CSI), and one or more group specific filtered interference plus noise signals.

11. The method as claimed in claim 1, wherein the method comprises determining one or more group specific filtered CSI and one or more group specific filtered interference parameters using the occupied subcarriers and null subcarriers that are associated with the group specific filtered DMRS and the signalled at least one antenna port number.

12. The method as claimed in claim 1, wherein the method comprises:
obtaining one or more group specific filtered CSI from the first stage filtering, and
obtaining one or more group specific filtered interference parameters from one or more group specific filtered interference plus noise signals.

13. The method as claimed in claim 12, wherein the second stage filtering comprises filtering of one or more group specific filtered data using one or more weights, and wherein said one or more weights are obtained using the one or more group specific filtered CSI and the one or more group specific filtered interference parameters.

14. The method as claimed in claim 1, wherein the second stage filtering is located in the co-located unit.

15. The method as claimed in claim 1, wherein the second stage filtering is located in a DU.

16. A base station (BS), comprising:
a transmitter configured to signal at least one of a demodulation reference signal (DMRS) configuration and a sounding reference signal (SRS) configuration to at least one user equipment (UE), wherein:
said DMRS configuration comprises signaling at least one antenna port number from a plurality of antenna port numbers, said at least one antenna port number indicates a location of occupied subcarriers and null subcarriers associated with a DMRS transmission of the at least one UE, and said SRS configuration comprises signaling of parameters associated with a time, a frequency and a code;
a receiver configured to receive at least one of: data and DMRS signals corresponding to the at least one UE, wherein said data and said DMRS signals are being received on one or more receive antennas of the at least one BS, and SRS signals corresponding to the at least one UE, wherein said SRS signals are being received on one or more receive antennas of the at least one BS;
a processor configured to grouping a subset of the plurality of signals, corresponding to a subset of antennas, to generate a plurality of signal groups, wherein signals, associated with each signal group of the plurality of signal groups, comprise at least one of the data signals and the DMRS signals;
a first stage filter configured to filter the plurality of signals, associated with each signal group of the plurality of signal groups, using one or more group specific filters to obtain one or more group specific filtered signals, wherein:
said group specific filters are determined using a set of parameters,
said set of parameters is determined based on one of the DMRS signals and the SRS signals,
the set of parameters, determined based on DMRS signals, comprise channel values and interference values measured from occupied and null subcarriers associated with the signaled at least one antenna port number, and
the set of parameters, determined based on SRS signals, comprises channel values associated with the SRS configuration;
a second stage filter configured to filter the one or more group specific filtered signals, associated with a plurality of the signal groups, to obtain one or more second stage filtered signals;
wherein a radio unit (RU) comprises the first stage filter and a distributed unit (DU) comprises the second stage filter.

17. The BS as claimed in claim 16, wherein the transmitter is configured to signal at least one antenna port number, of a plurality of antenna port numbers, to a connected UE, wherein the port numbers signalled by at least two BSs are distinct.

18. The BS as claimed in claim 16, wherein the transmitter is configured to signal an SRS configuration using parameters associated with a time, a frequency and a code, wherein the SRS configuration signalled by at least two BSs are distinct.

19. The BS as claimed in claim 16, wherein a location of occupied DMRS subcarriers and null subcarrier positions are associated with one or more OFDM symbols.

20. The BS as claimed in claim 16, wherein the set of parameters determined based on DMRS signals comprise channel and interference values measured from occupied and null subcarriers that are associated with the group specific filtered DMRS and the signalled at least one antenna port number.

21. The BS as claimed in claim 16, wherein the channel values associated with the SRS configuration are obtained by the DU.

22. The BS as claimed in claim 16, wherein the group specific filtered signals comprise at least one of one or more group specific filtered data signals, one or more group specific filtered DMRS, one or more group specific filtered channel state information (CSI), and one or more group specific filtered interference plus noise signals.

23. The BS as claimed in claim 16, wherein the processor is configured to determine one or more group specific filtered CSI and one or more group specific filtered interference parameters using the occupied subcarriers and null subcarriers that are associated with the group specific filtered DMRS and the signalled at least one antenna port number.

24. The BS as claimed in claim 16, wherein the processor is configured to obtain one or more group specific filtered CSI from the first stage filter, and wherein the processor is configured to obtain one or more group specific filtered interference parameters from one or more group specific filtered interference plus noise signals.

25. The BS as claimed in claim 16, wherein the second stage filter comprises one or more weights, and wherein the one or more weights are determined according to one or more group specific filtered CSI and one or more group specific filtered interference parameters.

* * * * *